(12) United States Patent
Tian et al.

(10) Patent No.: US 11,849,455 B2
(45) Date of Patent: Dec. 19, 2023

(54) CONFIGURATIONS OF COMMON PHYSICAL UPLINK CONTROL CHANNEL RESOURCE SETS

(71) Applicant: QUALCOMM Incorporated, San Diego, CA (US)

(72) Inventors: Qingjiang Tian, San Diego, CA (US); Jing Sun, San Diego, CA (US); Ahmed Abdelaziz Ibrahim Abdelaziz Zewail, San Diego, CA (US); Wooseok Nam, San Diego, CA (US); Iyab Issam Sakhnini, San Diego, CA (US); Zhifei Fan, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 17/350,837

(22) Filed: Jun. 17, 2021

(65) Prior Publication Data

US 2022/0408428 A1    Dec. 22, 2022

(51) Int. Cl.
*H04W 4/00* (2018.01)
*H04W 72/21* (2023.01)
*H04B 1/713* (2011.01)
*H04W 72/0453* (2023.01)

(52) U.S. Cl.
CPC ............ *H04W 72/21* (2023.01); *H04B 1/713* (2013.01); *H04W 72/0453* (2013.01)

(58) Field of Classification Search
CPC .............................. H04B 1/713; H04B 1/7143
See application file for complete search history.

(56) References Cited

U.S. PATENT DOCUMENTS

2020/0118544 A1* 4/2020 Lee .................... G10L 15/063
2020/0280338 A1* 9/2020 Matsumura ........... H04L 1/1893
2020/0404708 A1* 12/2020 Zhang .................. H04W 16/14

* cited by examiner

*Primary Examiner* — Bo Hui A Zhu
(74) *Attorney, Agent, or Firm* — Muncy, Geissler, Olds & Lowe, P.C.

(57) ABSTRACT

Disclosed are techniques for wireless communication. In an aspect, a UE determines a configuration of a common PUCCH resource set that is based on a frequency hopping pattern and includes a first set of resource blocks (RBs) of a bandwidth part (BWP) in a first group of symbols and a second set of RBs of the BWP in a second group of symbols. In some designs, the second set of RBs is offset in frequency from the first set of RBs by a fixed hopping distance. In other designs, the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

29 Claims, 20 Drawing Sheets

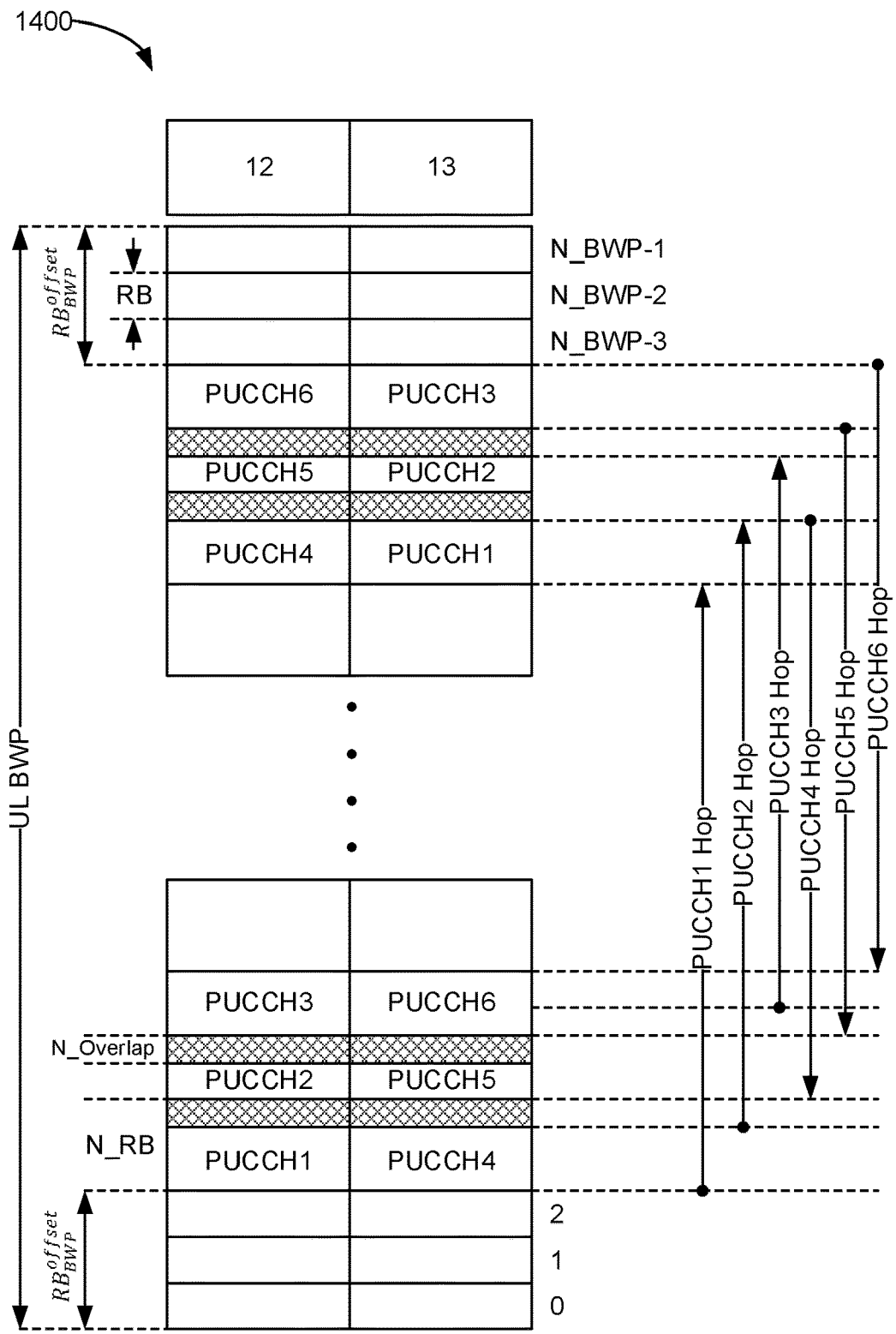
FIG. 14     PUCCH Resource Set Overlap (with Size = N_Overlap) 

CONFIGURATIONS OF COMMON PHYSICAL UPLINK CONTROL CHANNEL RESOURCE SETS

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some legacy NR designs, non-equal hopping distance of a physical uplink control channel (PUCCH) resource set is implemented between symbols. In particular, PUCCH hops are implemented such that the PUCCH resource block (RB) allocations in one symbol are mirrored (across a bandwidth part (BWP)) in another symbol. This non-equal hopping distance may result in inadequate frequency diversity gain for certain PUCCH resource sets that undergo short frequency hops between symbols.

Aspects of the disclosure are directed to frequency hopping patterns for PUCCH resource sets for increased diversity gain for certain PUCCH resource sets. In some designs, instead of frequency hopping patterns that result in "mirrored" PUCCH-to-RB allocations across an UL BWP, a fixed (or equal) hopping distance may be used. In other designs, RBs of adjacent PUCCH resource groups in the same group of symbols may overlap in part (e.g., the PUCCH resources are crunched together somewhat, which helps to maintain longer frequency hops between symbols for the respective PUCCH resource sets, irrespective of whether a fixed or non-fixed hopping distance is implemented). Such aspects may provide various technical advantages, such as facilitating greater frequency diversity gain, which may increase a success rate of uplink transmission (e.g., higher success rate for ACK to Msg-4 of 4-step RACH procedure, higher success rate for ACK to Msg-B of 2-step RACH procedure, etc.).

In an aspect, a method of operating a user equipment (UE) includes determining a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmitting, during the first group of symbols, a first uplink transmission on the first set of RBs of the BWP in accordance with the frequency hopping pattern; and transmitting, during the second group of symbols, a second uplink transmission on the second set of RBs of the BWP in accordance with the frequency hopping pattern, wherein the second set of RBs is offset in frequency from the first set of RBs by a fixed hopping distance.

In some aspects, the first and second sets of RBs each includes a single RB.

In some aspects, the first and second sets of RBs each includes multiple RBs.

In some aspects, the fixed hopping distance is configured via radio resource control (RRC) signaling.

In some aspects, the fixed hopping distance is configured via system information block (SIB).

In some aspects, the fixed hopping distance is derived at the UE using a hopping distance derivation rule.

In some aspects, the hopping distance derivation rule is based on a number of RBs in the BWP, a BWP physical RB (PRB) offset, a number of RBs among each of the first and second sets of RBs, and a number of cyclic shifts (CSs) per RB.

In some aspects, the method includes receiving an indication of whether to implement the fixed hopping distance derivation rule for derivation of the fixed hopping distance.

In some aspects, the indication is received at the UE via system information block (SIB).

In some aspects, the first and second sets of RBs are arranged within the BWP in part based on a number of RBs among each of the first and second sets of RBs.

In some aspects, the BWP is associated with a plurality of common PUCCH resource sets that each include respective sets of RBs that do not overlap with respective sets of RBs of any other common PUCCH resource set in the same group of symbols.

In some aspects, the method includes determining to implement the fixed hopping distance between the first and second sets of RBs based in part on a number of RBs among each of the first and second sets of RBs.

In some aspects, the fixed hopping distance is implemented if the number of RBs is greater than a threshold.

In some aspects, the fixed hopping distance is configured via radio resource control (RRC) signaling, or the fixed hopping distance is derived at the UE using a hopping distance derivation rule.

In some aspects, the first and second uplink transmissions are associated with a random access channel (RACH) procedure.

In some aspects, the RACH procedure is a 4-step RACH procedure and the first and second uplink transmissions are associated with an acknowledgement for Msg-4 of the RACH procedure.

In some aspects, the RACH procedure is a 2-step RACH procedure and the first and second uplink transmissions are associated with an acknowledgement for Msg-B of the RACH procedure.

In an aspect, a method of operating a user equipment (UE) includes determining a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmitting, during the first group of symbols, a first uplink transmission on the first set of RBs of the BWP in accordance with the frequency hopping pattern; and transmitting, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

In some aspects, the second set of RBs is offset in frequency from the first set of RBs by a fixed hopping distance and the third set of RBs is offset in frequency from the fourth set of RBs by the fixed hopping distance.

In some aspects, the second set of RBs is offset in frequency from the first set of RBs by a first hopping distance and the third set of RBs is offset in frequency from the fourth set of RBs by a second hopping distance that is different than the first hopping distance.

In some aspects, the third set of RBs is shifted in frequency relative to the first set of RBs, the fourth set of RBs is shifted in frequency relative to the second set of RBs, or a combination thereof.

In an aspect, a user equipment (UE) includes a memory; at least one transceiver; and at least one processor communicatively coupled to the memory and the at least one transceiver, the at least one processor configured to: determine a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmit, via the at least one transceiver, during the first group of symbols, a first uplink transmission on the first set of RBs of the BWP in accordance with the frequency hopping pattern; and transmit, via the at least one transceiver, during the second group of symbols, a second uplink transmission on the second set of RBs of the BWP in accordance with the frequency hopping pattern, wherein the second set of RBs is offset in frequency from the first set of RBs by a fixed hopping distance.

In some aspects, the first and second sets of RBs each includes a single RB.

In some aspects, the first and second sets of RBs each includes multiple RBs.

In some aspects, the fixed hopping distance is configured via radio resource control (RRC) signaling.

In some aspects, the fixed hopping distance is configured via system information block (SIB).

In some aspects, the fixed hopping distance is derived at the UE using a hopping distance derivation rule.

In some aspects, the hopping distance derivation rule is based on a number of RBs in the BWP, a BWP physical RB (PRB) offset, a number of RBs among each of the first and second sets of RBs, and a number of cyclic shifts (CSs) per RB.

In some aspects, the at least one processor is further configured to: receive, via the at least one transceiver, an indication of whether to implement the fixed hopping distance derivation rule for derivation of the fixed hopping distance.

In some aspects, the indication is received at the UE via system information block (SIB).

In some aspects, the first and second sets of RBs are arranged within the BWP in part based on a number of RBs among each of the first and second sets of RBs.

In some aspects, the BWP is associated with a plurality of common PUCCH resource sets that each include respective sets of RBs that do not overlap with respective sets of RBs of any other common PUCCH resource set in the same group of symbols.

In some aspects, the at least one processor is further configured to: determine to implement the fixed hopping distance between the first and second sets of RBs based in part on a number of RBs among each of the first and second sets of RBs.

In some aspects, the fixed hopping distance is implemented if the number of RBs is greater than a threshold.

In some aspects, the fixed hopping distance is configured via radio resource control (RRC) signaling, or the fixed hopping distance is derived at the UE using a hopping distance derivation rule.

In some aspects, the first and second uplink transmissions are associated with a random access channel (RACH) procedure.

In some aspects, the RACH procedure is a 4-step RACH procedure and the first and second uplink transmissions are associated with an acknowledgement for Msg-4 of the RACH procedure.

In some aspects, the RACH procedure is a 2-step RACH procedure and the first and second uplink transmissions are associated with an acknowledgement for Msg-B of the RACH procedure.

In an aspect, a UE includes a memory; at least one transceiver; and at least one processor communicatively coupled to the memory and the at least one transceiver, the at least one processor configured to: determine a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmit, via the at least one transceiver, during the first group of symbols, a first uplink transmission on the first set of RBs of the BWP in accordance with the frequency hopping pattern; and transmit, via the at least one transceiver, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

In some aspects, the second set of RBs is offset in frequency from the first set of RBs by a fixed hopping distance and the third set of RBs is offset in frequency from the fourth set of RBs by the fixed hopping distance.

In some aspects, the second set of RBs is offset in frequency from the first set of RBs by a first hopping distance and the third set of RBs is offset in frequency from the fourth set of RBs by a second hopping distance that is different than the first hopping distance.

In some aspects, the third set of RBs is shifted in frequency relative to the first set of RBs, the fourth set of RBs is shifted in frequency relative to the second set of RBs, or a combination thereof.

In an aspect, a user equipment (UE) includes means for determining a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; means for transmitting, during the first group of symbols, a first uplink transmission on the first set of RBs of the BWP in accordance with the frequency hopping pattern; and means for transmitting, during the second group of symbols, a second uplink transmission on the second set of RBs of the BWP in accordance with the frequency hopping pattern, wherein the second set of RBs is offset in frequency from the first set of RBs by a fixed hopping distance.

In some aspects, the first and second sets of RBs each includes a single RB.

In some aspects, the first and second sets of RBs each includes multiple RBs.

In some aspects, the fixed hopping distance is configured via radio resource control (RRC) signaling.

In some aspects, the fixed hopping distance is configured via system information block (SIB).

In some aspects, the fixed hopping distance is derived at the UE using a hopping distance derivation rule.

In some aspects, the hopping distance derivation rule is based on a number of RBs in the BWP, a BWP physical RB (PRB) offset, a number of RBs among each of the first and second sets of RBs, and a number of cyclic shifts (CSs) per RB.

In some aspects, the method includes means for receiving an indication of whether to implement the fixed hopping distance derivation rule for derivation of the fixed hopping distance.

In some aspects, the indication is received at the UE via system information block (SIB).

In some aspects, the first and second sets of RBs are arranged within the BWP in part based on a number of RBs among each of the first and second sets of RBs.

In some aspects, the BWP is associated with a plurality of common PUCCH resource sets that each include respective sets of RBs that do not overlap with respective sets of RBs of any other common PUCCH resource set in the same group of symbols.

In some aspects, the method includes means for determining to implement the fixed hopping distance between the first and second sets of RBs based in part on a number of RBs among each of the first and second sets of RBs.

In some aspects, the fixed hopping distance is implemented if the number of RBs is greater than a threshold.

In some aspects, the fixed hopping distance is configured via radio resource control (RRC) signaling, or the fixed hopping distance is derived at the UE using a hopping distance derivation rule.

In some aspects, the first and second uplink transmissions are associated with a random access channel (RACH) procedure.

In some aspects, the RACH procedure is a 4-step RACH procedure and the first and second uplink transmissions are associated with an acknowledgement for Msg-4 of the RACH procedure.

In some aspects, the RACH procedure is a 2-step RACH procedure and the first and second uplink transmissions are associated with an acknowledgement for Msg-B of the RACH procedure.

In an aspect, a UE includes means for determining a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; means for transmitting, during the first group of symbols, a first uplink transmission on the first set of RBs of the BWP in accordance with the frequency hopping pattern; and means for transmitting, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

In some aspects, the second set of RBs is offset in frequency from the first set of RBs by a fixed hopping distance and the third set of RBs is offset in frequency from the fourth set of RBs by the fixed hopping distance.

In some aspects, the second set of RBs is offset in frequency from the first set of RBs by a first hopping distance and the third set of RBs is offset in frequency from the fourth set of RBs by a second hopping distance that is different than the first hopping distance.

In some aspects, the third set of RBs is shifted in frequency relative to the first set of RBs, the fourth set of RBs is shifted in frequency relative to the second set of RBs, or a combination thereof.

In an aspect, a non-transitory computer-readable medium storing computer-executable instructions that, when executed by a user equipment (UE), cause the UE to: determine a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmit, during the first group of symbols, a first uplink transmission on the first set of RBs of the BWP in accordance with the frequency hopping pattern; and transmit, during the second group of symbols, a second uplink transmission on the second set of RBs of the BWP in accordance with the frequency hopping pattern, wherein the second set of RBs is offset in frequency from the first set of RBs by a fixed hopping distance.

In some aspects, the first and second sets of RBs each includes a single RB.

In some aspects, the first and second sets of RBs each includes multiple RBs.

In some aspects, the fixed hopping distance is configured via radio resource control (RRC) signaling.

In some aspects, the fixed hopping distance is configured via system information block (SIB).

In some aspects, the fixed hopping distance is derived at the UE using a hopping distance derivation rule.

In some aspects, the hopping distance derivation rule is based on a number of RBs in the BWP, a BWP physical RB (PRB) offset, a number of RBs among each of the first and second sets of RBs, and a number of cyclic shifts (CSs) per RB.

In some aspects, the one or more instructions further cause the UE to: receive an indication of whether to implement the fixed hopping distance derivation rule for derivation of the fixed hopping distance.

In some aspects, the indication is received at the UE via system information block (SIB).

In some aspects, the first and second sets of RBs are arranged within the BWP in part based on a number of RBs among each of the first and second sets of RBs.

In some aspects, the BWP is associated with a plurality of common PUCCH resource sets that each include respective sets of RBs that do not overlap with respective sets of RBs of any other common PUCCH resource set in the same group of symbols.

In some aspects, the one or more instructions further cause the UE to: determine to implement the fixed hopping distance between the first and second sets of RBs based in part on a number of RBs among each of the first and second sets of RBs.

In some aspects, the fixed hopping distance is implemented if the number of RBs is greater than a threshold.

In some aspects, the fixed hopping distance is configured via radio resource control (RRC) signaling, or the fixed hopping distance is derived at the UE using a hopping distance derivation rule.

In some aspects, the first and second uplink transmissions are associated with a random access channel (RACH) procedure.

In some aspects, the RACH procedure is a 4-step RACH procedure and the first and second uplink transmissions are associated with an acknowledgement for Msg-4 of the RACH procedure.

In some aspects, the RACH procedure is a 2-step RACH procedure and the first and second uplink transmissions are associated with an acknowledgement for Msg-B of the RACH procedure.

In an aspect, a non-transitory computer-readable medium storing computer-executable instructions that, when executed by a UE, cause the UE to: determine a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmit, during the first group of symbols, a first uplink transmission on the first set of RBs of the BWP in accordance with the frequency hopping pattern; and transmit, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

In some aspects, the second set of RBs is offset in frequency from the first set of RBs by a fixed hopping distance and the third set of RBs is offset in frequency from the fourth set of RBs by the fixed hopping distance.

In some aspects, the second set of RBs is offset in frequency from the first set of RBs by a first hopping distance and the third set of RBs is offset in frequency from the fourth set of RBs by a second hopping distance that is different than the first hopping distance.

In some aspects, the third set of RBs is shifted in frequency relative to the first set of RBs, the fourth set of RBs is shifted in frequency relative to the second set of RBs, or a combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 14 illustrates a multi-RB resource configuration of UL BWP in accordance with an example implementation of the process of FIG. 13.

DETAILED DESCRIPTION

Figure 1:
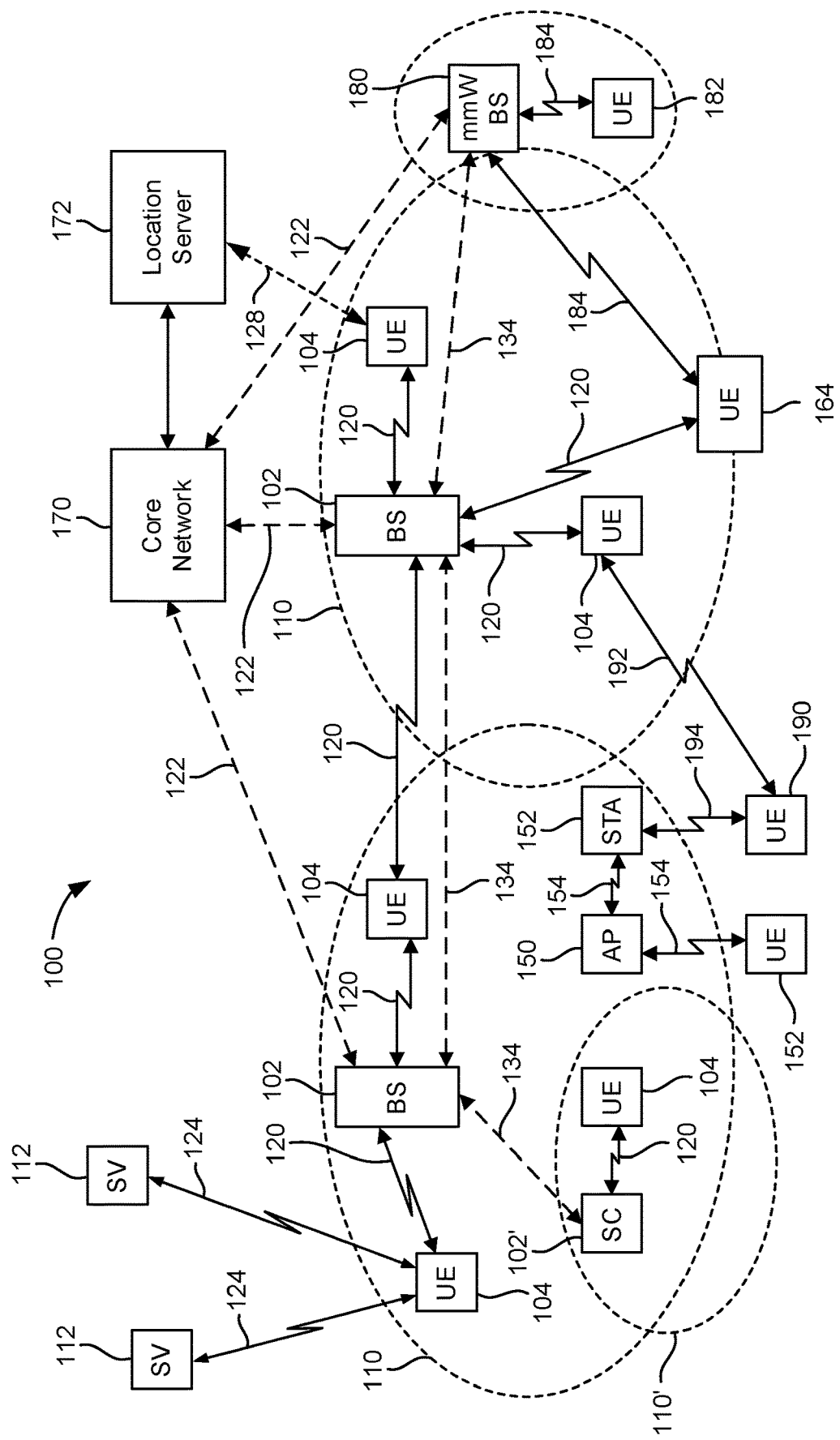
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
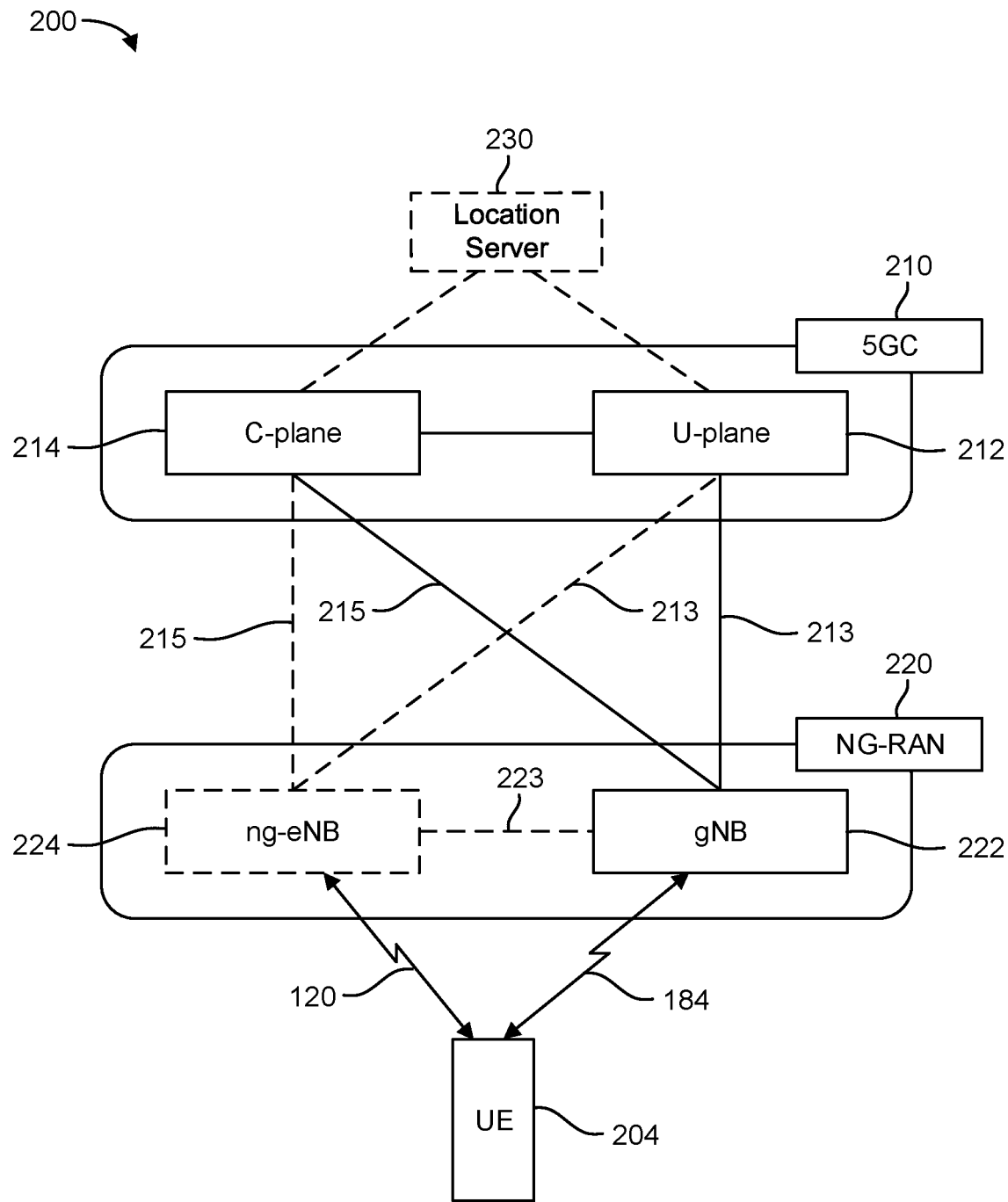
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
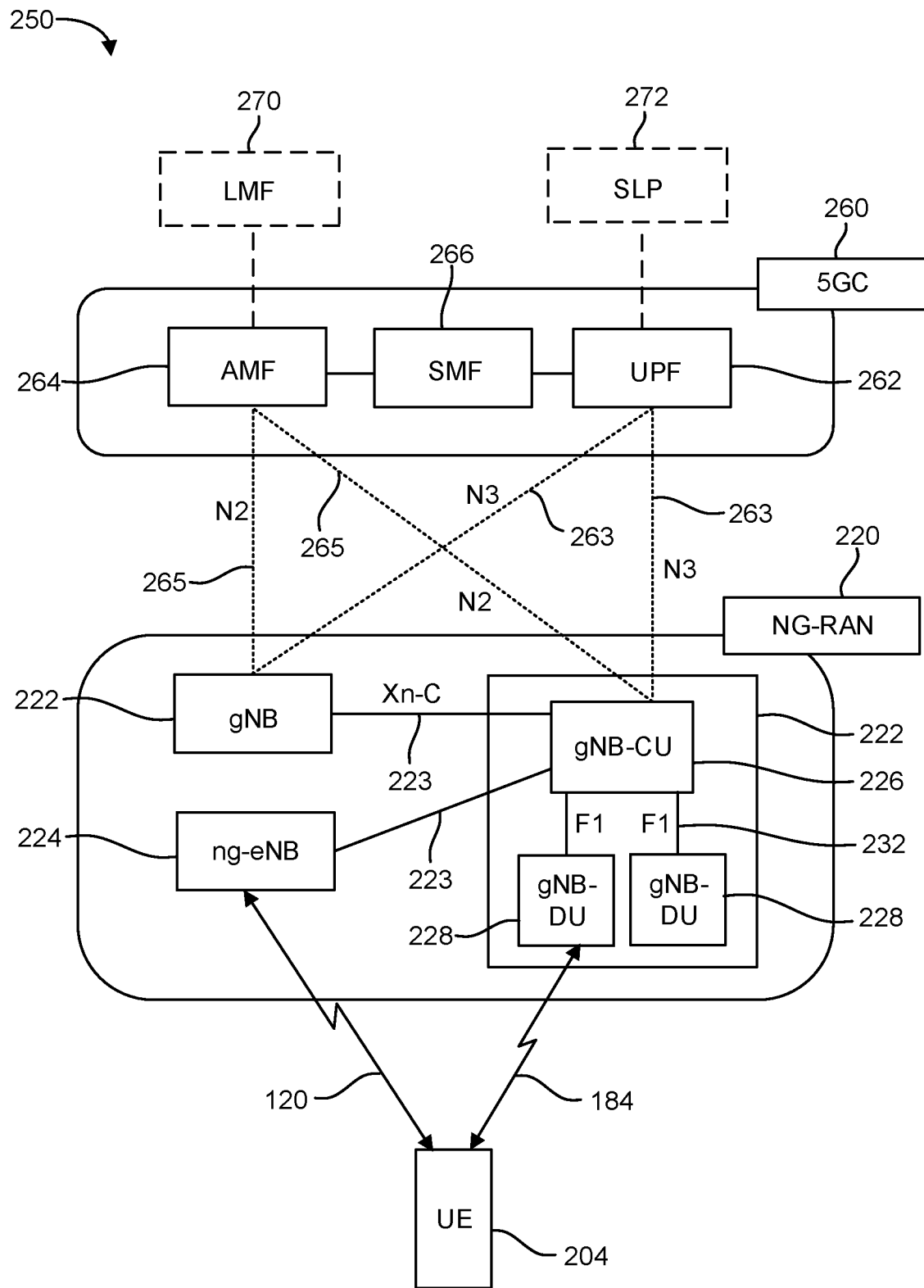

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
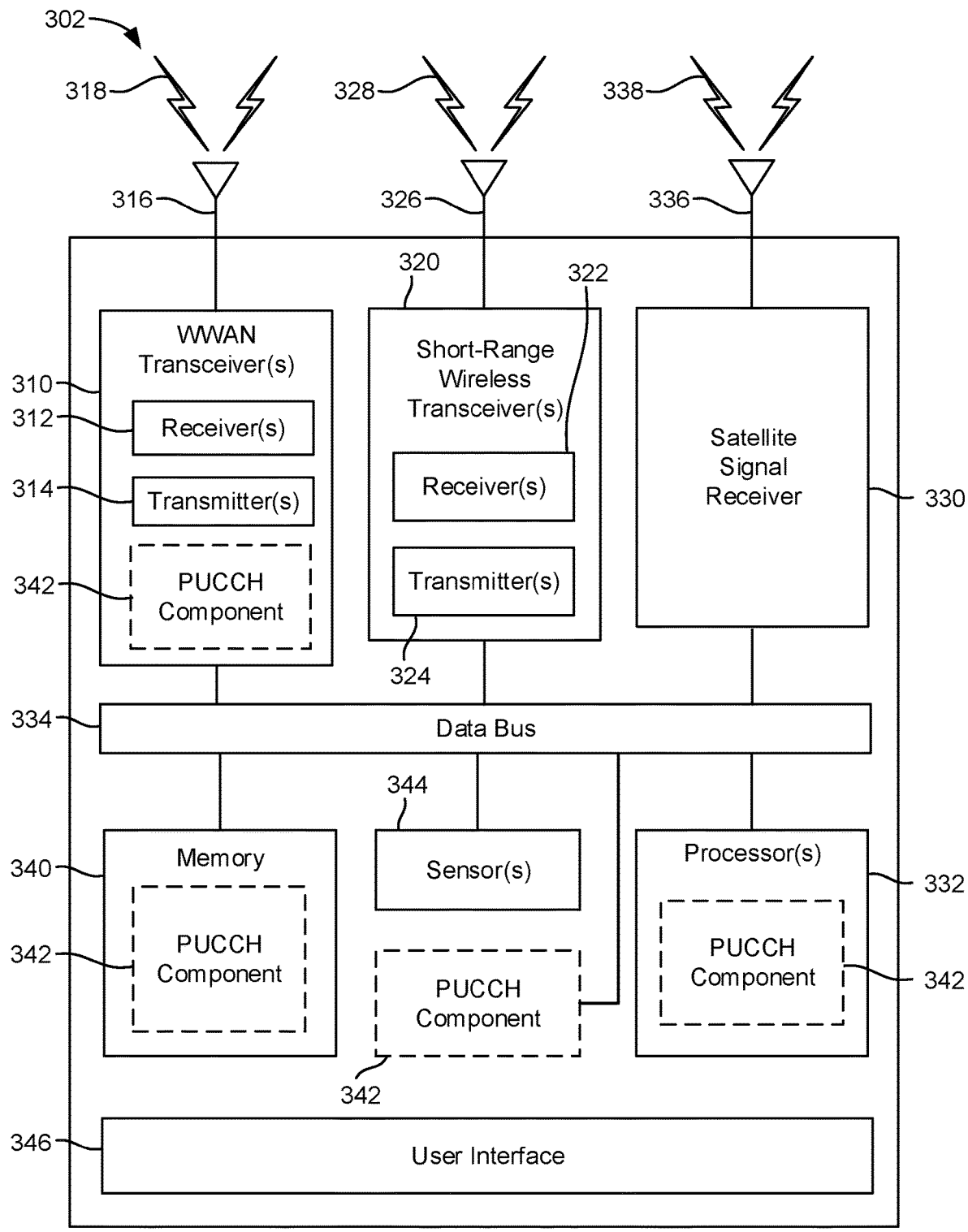
FIGS. 3A, 3B, and 3C are simplified block diagrams of several sample aspects of components that may be employed in a user equipment (UE), a base station, and a network entity, respectively, and configured to support communications as taught herein.
Figure 3B:
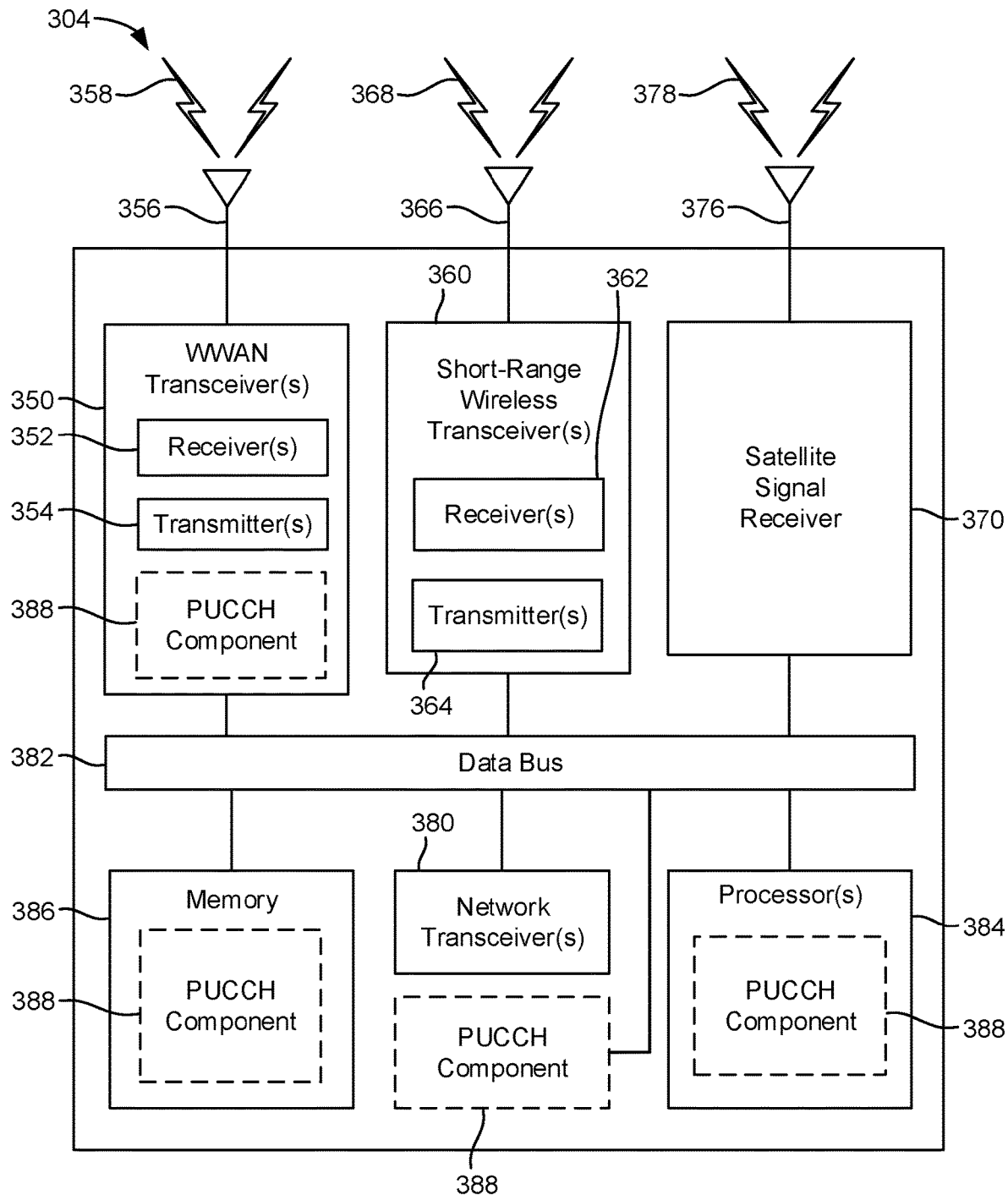
Figure 3C:
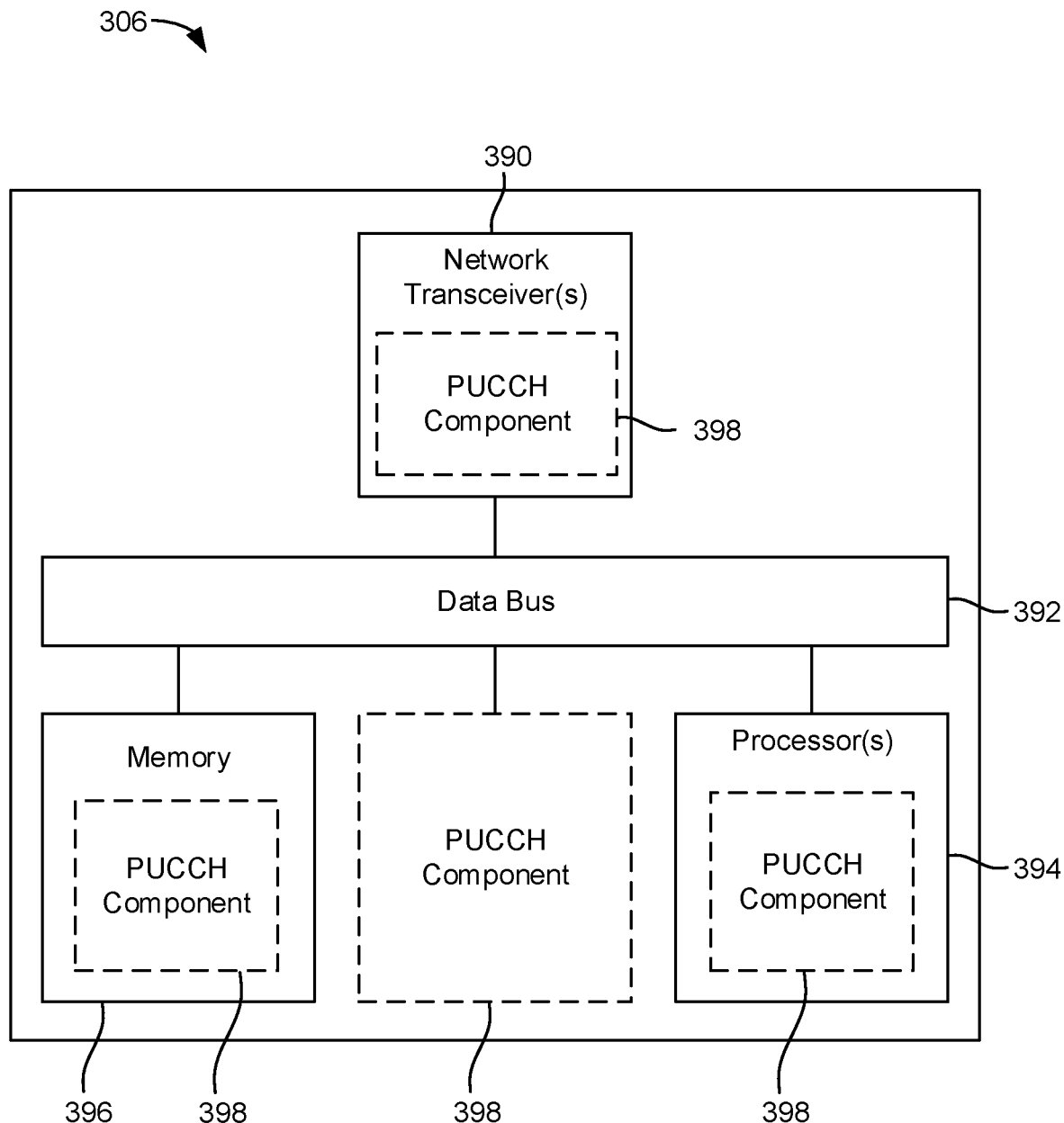

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include PUCCH component 342, 388, and 398, respectively. The PUCCH component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the PUCCH component 342, 388, and 398 may be external to the processors 332, 384, and 394 (e.g., part of a modem processing system, integrated with another processing system, etc.). Alternatively, the PUCCH component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the PUCCH component 342, which may be, for example, part of the one or more WWAN transceivers 310, the memory 340, the one or more processors 332, or any combination thereof, or may be a standalone component. FIG. 3B illustrates possible locations of the PUCCH component 388, which may be, for example, part of the one or more WWAN transceivers 350, the memory 386, the one or more processors 384, or any combination thereof, or may be a standalone component. FIG. 3C illustrates possible locations of the PUCCH component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIB s)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the PUCCH component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
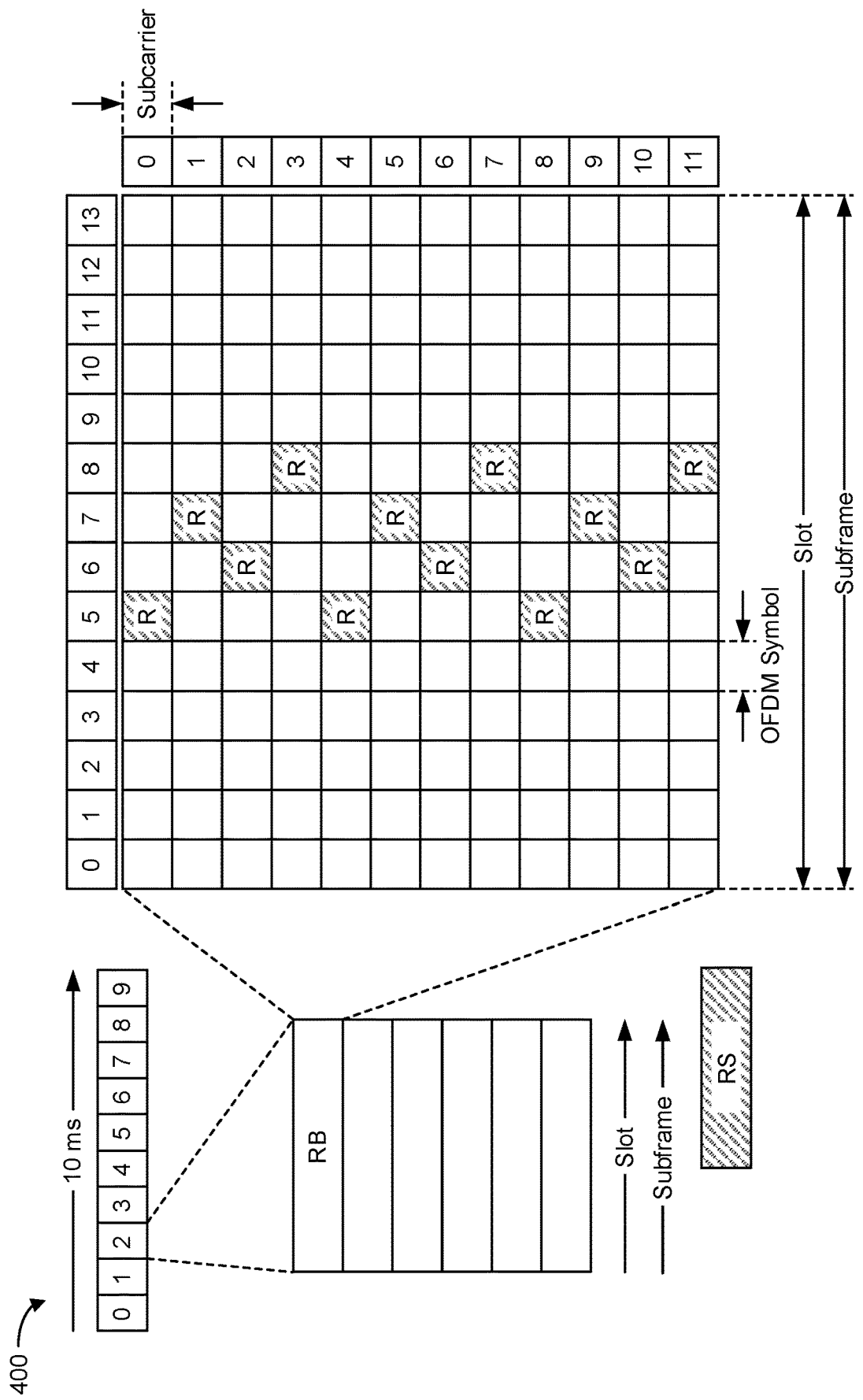
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu=0$), 30 kHz ($\mu=1$), 60 kHz ($\mu=2$), 120 kHz ($\mu=3$), and 240 kHz ($\mu=4$) or greater may be available. In each subcarrier spacing, there are 14 symbols per slot. For 15 kHz SCS ($\mu=0$), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu=1$), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu=2$), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu=3$), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
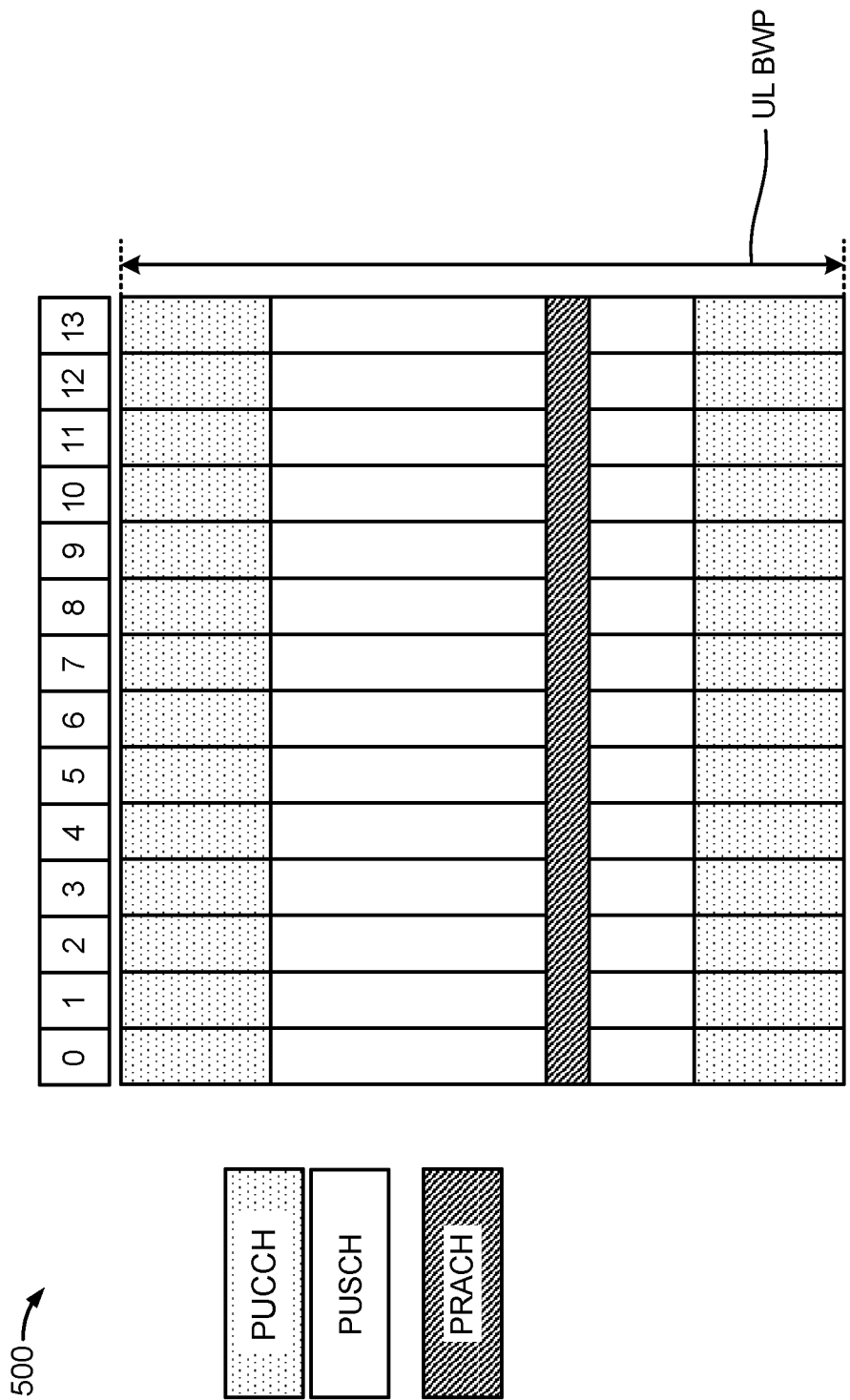
FIG. 5 is a diagram illustrating various uplink channels within an example uplink slot, according to aspects of the disclosure.

FIG. 5 is a diagram 500 illustrating various uplink channels within an example uplink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

In order to establish uplink synchronization and a radio resource control (RRC) connection with a base station (or more specifically, a serving cell/TRP), a UE needs to perform a random access procedure (also referred to as a random access channel (RACH) procedure or a physical random access channel (PRACH) procedure). There are two types of random access available in NR, contention based random access (CBRA), also referred to as "four-step" random access, and contention free random access (CFRA), also referred to as "three-step" random access. There is also a "two-step" random access procedure that may be performed instead of the four-step random access procedure in certain cases.

Figure 6:
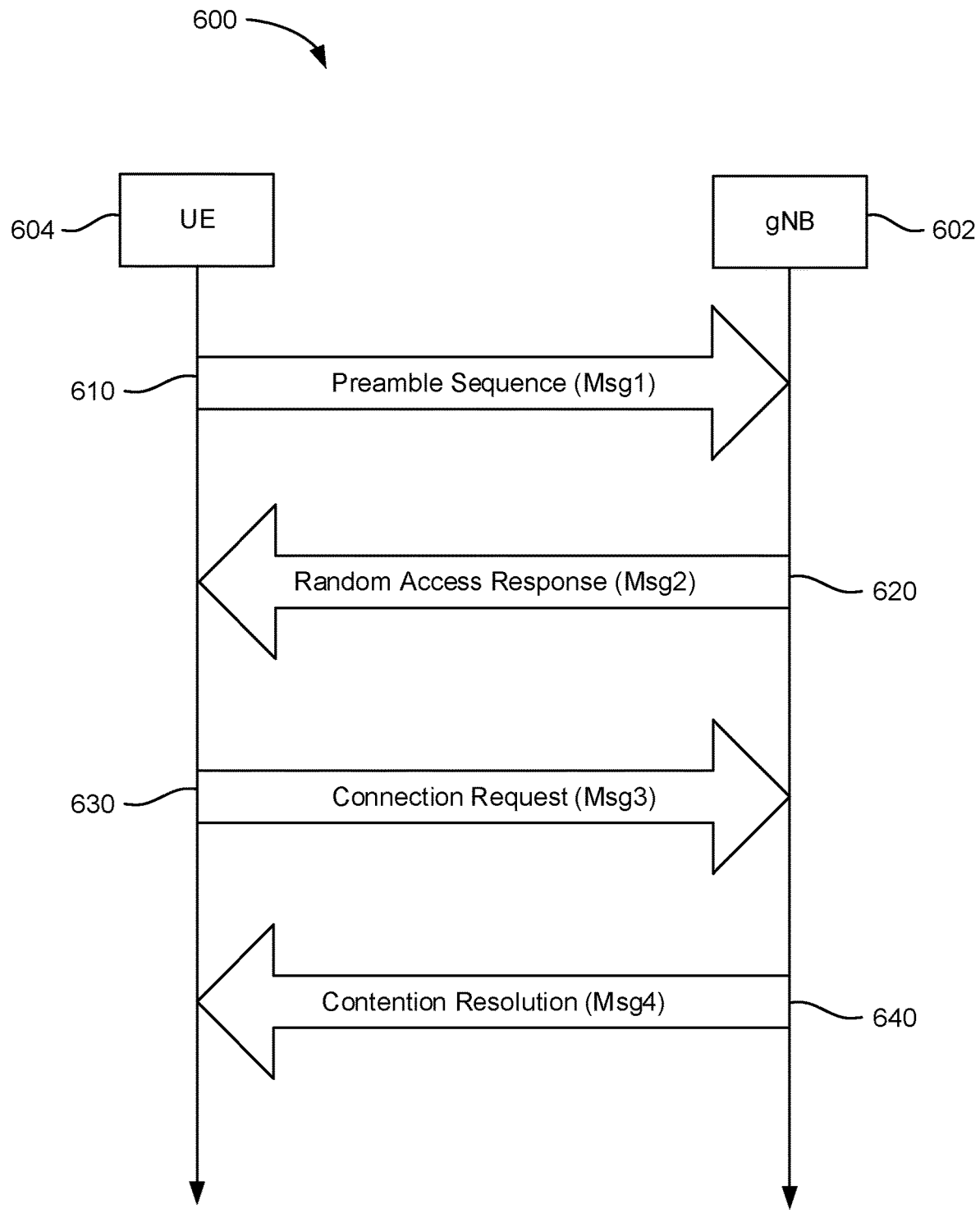
FIG. 6 illustrates an example four-step random access procedures, according to aspects of the disclosure.

FIG. 6 illustrates an example four-step random access procedure 600, according to aspects of the disclosure. The four-step random access procedure 600 is performed between a UE 604 and a base station 602 (illustrated as a gNB), which may correspond to any of the UEs and base stations, respectively, described herein.

There are various situations in which a UE 604 may perform the four-step random access procedure 600. For example, a UE 604 may perform the four-step random access procedure 600 when performing an initial RRC connection setup (i.e., acquiring initial network access after coming out of the RRC IDLE state), when performing an RRC connection re-establishment procedure, when the UE 604 has uplink data to transmit, when the UE 604 has uplink data to transmit and the UE 604 is in an RRC CONNECTED state but there are no PUCCH resources available for a scheduling request (SR), or when there is a scheduling request failure.

Before performing the four-step random access procedure 600, the UE 604 reads one or more synchronization signal blocks (SSBs) broadcasted by the base station 602 with which the UE 604 is performing the four-step random access procedure 600. In NR, each beam transmitted by a base station (e.g., base station 602) is associated with a different SSB, and a UE (e.g., UE 604) selects a certain beam to use to communicate with the base station 602. Based on the SSB of the selected beam, the UE 604 can then read the system information block (SIB) type 1 (SIB1), which carries cell access related information and supplies the UE 604 with the scheduling of other system information blocks transmitted on the selected beam.

When the UE 604 sends the very first message of the four-step random access procedure 600 to the base station 602, it sends a specific pattern called a "preamble" (also referred to as a "RACH preamble," a "PRACH preamble," a "sequence"). The preamble differentiates requests from different UEs 604. In CBRA, a UE 604 selects a preamble randomly from a pool of preambles (64 in NR) shared with other UEs 604. However, if two UEs 604 use the same preamble at the same time, then there can be a collision, or contention.

Thus, at 610, the UE 604 selects one of the 64 preambles to send to the base station 602 as a RACH request (also referred to as a "random access request"). This message is referred to as "Message 1" or "Msg1" in a four-step random access procedure 600. Based on the synchronization information from the base station 602 (e.g., the SIB1), the UE 604 sends the preamble at the RACH occasion (RO) corresponding to the selected SSB/beam. More specifically, in order for the base station 602 to determine which beam the UE 604 has selected, a specific mapping is defined between an SSB and an RO (which occur every 10, 20, 40, 80, or 160 ms). By detecting at which RO the UE 604 sent the preamble, the base station 602 can determine which SSB/beam the UE 604 selected.

Note that an RO is a time-frequency transmission opportunity for transmitting a preamble, and a preamble index (i.e., a value from 0 to 63 for the 64 possible preambles) enables the UE 604 to generate the type of preamble expected at the base station 602. The RO and preamble index may be configured to the UE 604 by the base station 602 in a SIB. A RACH resource is an RO in which one preamble index is transmitted. As such, the terms "RO" (or "RACH occasion") and "RACH resource" may be used interchangeably, depending on the context.

Due to reciprocity, the UE 604 may use the uplink transmit beam corresponding to the best downlink receive beam determined during synchronization (i.e., the best receive beam to receive the selected downlink beam from the base station 602). That is, the UE 604 uses the parameters of the downlink receive beam used to receive the SSB beam from the base station 602 to determine the parameters of the uplink transmit beam. If reciprocity is available at the base station 602, the UE 604 can transmit the preamble over one beam. Otherwise, the UE 604 repeats transmission of the same preamble on all of its uplink transmit beams.

The UE 604 also needs to provide its identity to the network (via base station 602) so that the network can address it in the next step. This identity is called the random access radio network temporary identity (RA-RNTI) and is determined from the time slot in which the preamble is sent.

If the UE 604 does not receive a response from the base station 602 within some period of time, it increases its transmission power by a fixed step and sends the preamble/Msg1 again. More specifically, the UE 604 transmits a first set of repetitions of the preamble, then, if it does not receive a response, it increases its transmission power and transmits a second set of repetitions of the preamble. The UE 604 continues increasing its transmit power in incremental steps until it receives a response from the base station 602.

At 620, the base station 602 sends a random access response (RAR), referred to as a "Message 2" or "Msg2" in a four-step random access procedure 600, to the UE 604 on the selected beam. The RAR is sent on a physical downlink shared channel (PDSCH) and is addressed to the RA-RNTI calculated from the time slot (i.e., RO) in which the preamble was sent. The RAR carries the following information: a cell-radio network temporary identifier (C-RNTI), a timing advance (TA) value, and an uplink grant resource. The base station 602 assigns the C-RNTI to the UE 604 to enable further communication with the UE 604. The TA value specifies how much the UE 604 should change its timing to compensate for the propagation delay between the UE 604 and the base station 602. The uplink grant resource indicates the initial resources the UE 604 can use on the physical uplink shared channel (PUSCH). After this step, the UE 604 and the base station 602 establish coarse beam alignment that can be utilized in the subsequent steps.

At 630, using the allocated PUSCH, the UE 604 sends an RRC connection request message, referred to as a "Message 3" or "Msg3," to the base station 602. Because the UE 604 sends the Msg3 over the resources scheduled by the base station 602, the base station 602 knows from where (spatially) to detect the Msg3 and therefore which uplink receive beam should be used. Note that the Msg3 PUSCH can be sent on the same or different uplink transmit beam as the Msg1.

The UE 604 identifies itself in the Msg3 by the C-RNTI assigned in the previous step. The message contains the UE's 604 identity and connection establishment cause. The UE's 604 identity is either a temporary mobile subscriber identity (TMSI) or a random value. A TMSI is used if the UE 604 has previously connected to the same network. The UE 604 is identified in the core network by the TMSI. A random value is used if the UE 604 is connecting to the network for the very first time. The reason for the random value or TMSI is that the C-RNTI may have been assigned to more than one UE 604 in the previous step, due to multiple requests arriving at the same time. The connection establishment cause indicates the reason why the UE 604 needs to connect to the network (e.g., for a positioning session, because it has uplink data to transmit, because it received a page from the network, etc.).

As noted above, the four-step random access procedure 600 is a CBRA procedure. Thus, as described above, any UE 604 connecting to the same base station 602 can send the same preamble at 610, in which case, there is a possibility of collision, or contention, among the requests from the various UEs 604. Accordingly, the base station 602 uses a contention resolution mechanism to handle this type of access request. In this procedure, however, the result is random and not all random access succeeds.

Thus, at 640, if the Msg3 was successfully received, the base station 602 responds with a contention resolution message, referred to as a "Message 4" or "Msg4." This message is addressed to the TMSI or random value (from the Msg3) but contains a new C-RNTI that will be used for further communication. Specifically, the base station 602 sends the Msg4 in the PDSCH using the downlink transmit beam determined in the previous step.

As shown in FIG. 6, the four-step random-access procedure 600 requires two round-trip cycles between the UE 604 and the base station 602, which not only increases latency but also incurs additional control signaling overhead. To address these issues, two-step random access has been introduced in NR for CBRA. The motivation behind two-step random access is to reduce latency and control signaling overhead by having a single round trip cycle between a UE and a base station. This is achieved by combining the preamble (Msg1) and the scheduled PUSCH transmission (Msg3) into a single message from the UE to the base station, known as "MsgA." Similarly, the random access response (Msg2) and the contention resolution message (Msg4) are combined into a single message from the base station to the UE, known as "MsgB." This reduces latency and control signaling overhead.

Figure 7:
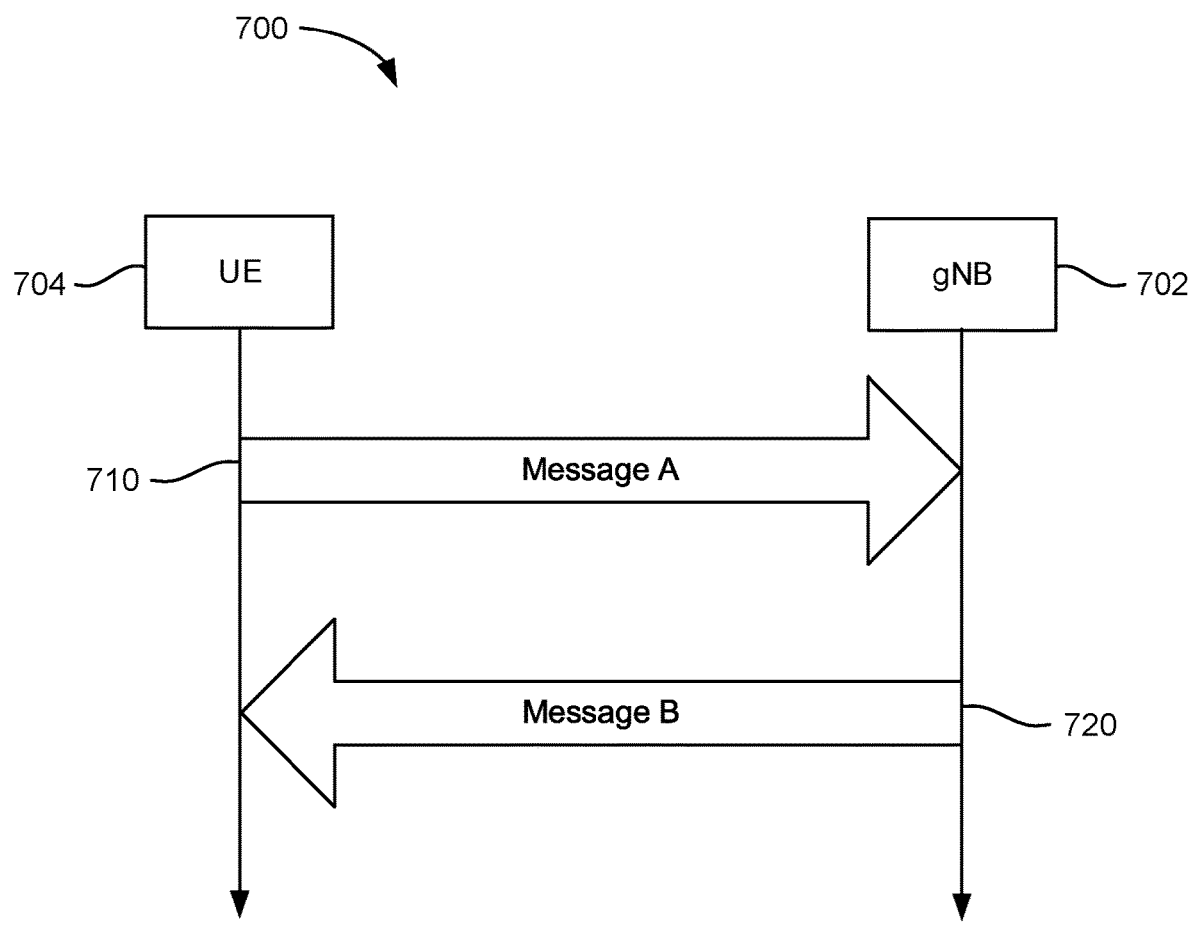
FIG. 7 illustrates an example two-step random access procedure, according to aspects of the disclosure.

FIG. 7 illustrates an example two-step random access procedure 700, according to aspects of the disclosure. The two-step random access procedure 700 may be performed between a UE 704 and a base station 702 (illustrated as a gNB), which may correspond to any of the UEs and base stations, respectively, described herein.

At 710, the UE 704 transmits a RACH Message A ("MsgA") to the base station 702. In a two-step random access procedure 700, Msg1 and Msg3, described above with reference to FIG. 6, are collapsed (i.e., combined) into a MsgA and sent to the base station 702. As such, a MsgA includes a preamble and a PUSCH similar to the Msg3 PUSCH of a four-step random access procedure 600. The preamble may have been selected from the 64 possible preambles, as described above with reference to FIG. 6, and may be used as a reference signal for demodulating the data transmitted in the MsgA. At 720, the UE 704 receives a RACH Message B ("MsgB") from the base station 702. The MsgB may be a combination of Msg2 and Msg4 described above with reference to FIG. 6.

The combination of Msg1 and Msg3 into one MsgA and the combination of Msg2 and Msg4 into one MsgB allows the UE 704 to reduce the RACH procedure setup time to support the low-latency requirements of NR. Although the UE 704 may be configured to support the two-step random access procedure 700, the UE 704 may still support the four-step random access procedure 600 as a fall back if the UE 704 is not able to use the two-step random access procedure 700 due to some constraints (e.g., high transmit power requirements, etc.). Therefore, a UE 704 in NR may be configured to support both the four-step and the two-step random access procedures 600 and 700, and may determine which random access procedure to use based on the RACH configuration information received from the base station 702.

In some NR designs, a 16-entry common PUCCH Resource set table is defined. In some designs, each PUCCH resource is associated with one particular RB per symbol. In this case, an example 16-entry common PUCCH Resource set table may be defined as follows:

TABLE 1

1-RB PUCCH Format 0/1

| Index | PUCCH format | First Symbol | Number of Symbols | PRB Offset $RB_{BWP}^{offset}$ | Set of Initial CS Indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $N_{BWP}^{size}/4$ | {0, 3, 6, 9} |

In some designs, prior to RRC configuration, a set of cell-specific PUCCH resources may be configured via SIB1 for the initial UL BWP (of the PCell). In some designs, the parameter pucch-ResourceCommon in SIB1, which is between [0,15], designates the Index field of Table 1 (above). Before UE-specific PUCCH configuration, UE may utilize common PUCCH resource(s) to send uplink information. For example, during initial access, gNB may use DCI 1_0 to schedule Msg4. Within the DCI, there is a 3-bit PUCCH resource indicator (PRI). The UE may use this PRI and the location of the PDCCH grant to derive the resource set to send ACK to Msg4.

Figure 8:
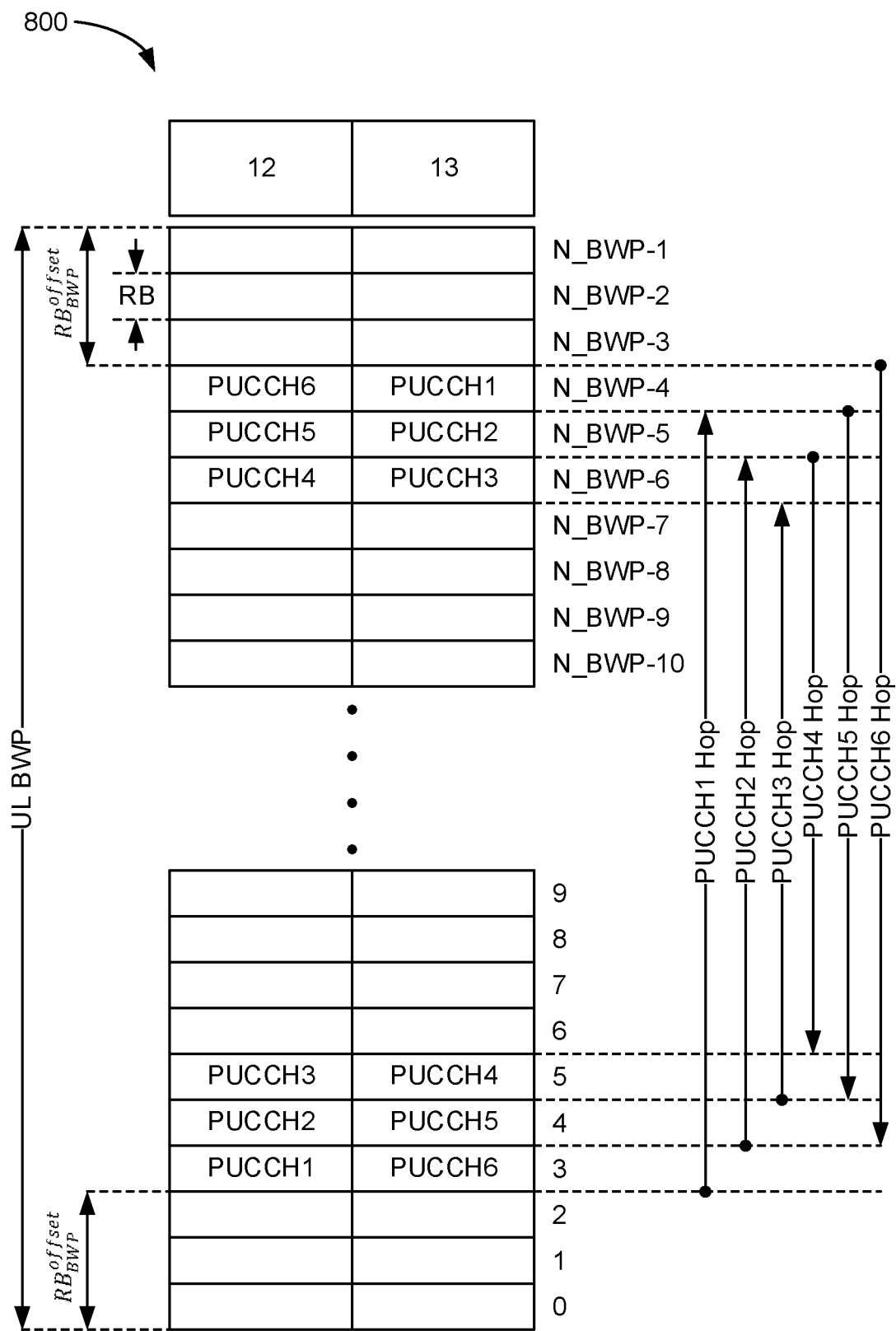
FIG. 8 illustrates a resource configuration of UL BWP in accordance with an aspect of the disclosure.

FIG. 8 illustrates a resource configuration 800 of UL BWP in accordance with an aspect of the disclosure. With respect to FIG. 8, it is assumed that pucch-ResourceCommon=2 (i.e., Index=2 in Table 1), such that the resource configuration 800 is associated with PUCCH format 0, first symbol=12, number of symbols (Nsymbol)=2, $R_{BWP}^{offset}$=3, and set of initial CS indexes={0,4,8}. For common PUCCH resource set, a first group of symbols (e.g., which consists of the first $$\frac{N_{symbol}}{2}$$

out of total Nsymbol symbols) use a first RB and a second group of symbols (e.g., which consists of the remaining $$\frac{N_{symbol}}{2}$$

symbols out of total Nsymbol symbols) uses a second RB. An example of how the PUCCH RB for a particular UE can be derived for each group of symbols (in this case, the first group of symbols consists of symbols 12 and the second group of symbols consists of symbol 13) will now be described. In FIG. 8, the resource configuration 800 includes PUCCH resources for PUCCH resource sets denoted as PUCCH1 through PUCCH6. Note that for each of PUCCH1 to PUCCH6, there may be more than one other common PUCCH resource set that occupy the same RB resource but with different initial CS, as illustrated below. In FIG. 8, for a particular RB pair allocation in two symbols, only one PUCCH resource set is illustrated. In FIG. 8, the UL BWP includes RBs 0 . . . N_BWP-1.

First, let $$\gamma_{PUCCH} = \left\lfloor \frac{2*n_{CCE,0}}{N_{CCE,0}} \right\rfloor + 2*PRI,$$

where $n_{CCE,0}$ is the index of the first CCE used to transmit DCI/PDCCH for resource scheduling and $N_{CCE,0}$ is the total number of CCEs within the corresponding Control Resource Set (CORESET). It may be seen that $\gamma_{PUCCH}$ is between 0 and 15. The RB index in the first group of symbols (symbol 12 for this example) and second group of symbols (symbol 13 for this example) may be derived as follows:

If $\gamma_{PUCCH}$<8, the RB index in the first group of $$\text{symbols} = RB_{BWP}^{offset} + \left\lfloor \frac{\gamma_{PUCCH}}{N_{CS}} \right\rfloor,$$

the RB index in the second group of $$\text{symbols} = N_{BWP}^{size} - 1 - RB_{BWP}^{offset} - \left\lfloor \frac{\gamma_{PUCCH}}{N_{CS}} \right\rfloor,$$

and

If $\gamma_{PUCCH}$>=8, the RB index in the first group of symbols is given by $$N_{BWP}^{size} - 1 - RB_{BWP}^{offset} - \left\lfloor \frac{\gamma_{PUCCH} - 8}{N_{CS}} \right\rfloor,$$

and the RB index in the second group of symbols is given by $$RB_{BWP}^{offset} + \left\lfloor \frac{\gamma_{PUCCH} - 8}{N_{CS}} \right\rfloor.$$

whereby $N_{CS}$ indicates the number of CS indexes per RB.

An initial cyclic shift (CS) for a common PUCCH resource set may be derived as $\gamma_{PUCCH}$ mod Ncs if $\gamma_{PUCCH}$<8, or as ($\gamma_{PUCCH}$-8) mod Ncs if $\gamma_{PUCCH}$>=8. PUCCH resources with same RB but with different CS may be referred to as a "resource group". In FIG. 8, for example, as Ncs=3, there will be 3 PUCCHs which all occupies RB 3 in symbol 12 and RB $N_{BWP}^{size}$-4 in symbol 13, and PUCCH1 is one of these 3 PUCCHs in this resource group. Note that in FIG. 8 PUCCH format 0 is used as example (which only uses 2 symbols), gNB may configure pucch-ResourceCommon such that a PUCCH format 1 is used, for example, pucch-ResourceCommon=3, first symbol=10, number of symbols (N symbol)=4. In this case, if $\gamma_{PUCCH}$<8, a common PUCCH format 1 uses same RB with index $$RB_{BWP}^{offset} + \left\lfloor \frac{\gamma_{PUCCH}}{N_{CS}} \right\rfloor$$

in the first group of symbols (symbol 10 and 11) and same RB with index $$N_{BWP}^{size} - 1 - RB_{BWP}^{offset} - \left\lfloor \frac{\gamma_{PUCCH}}{N_{CS}} \right\rfloor$$

in the second group of symbols (symbol 12 and symbol 13). If $\gamma_{PUCCH}$>=8, a common PUCCH format 1 uses same RB with index $$RB_{BWP}^{offset} + \left\lfloor \frac{\gamma_{PUCCH}}{N_{CS}} \right\rfloor$$

in the first group of symbols (symbol 10 and 11) and same RB with index $$N_{BWP}^{size} - 1 - RB_{BWP}^{offset} - \left\lfloor \frac{\gamma_{PUCCH}}{N_{CS}} \right\rfloor$$

in the second group of symbols (which consist of symbol 12 and symbol 13). Following examples may continue to use PUCCH format 0 (for which each group of symbols only consists of one symbol), but it should be obvious to people familiar with this matter that aspects in this disclosure may be equally applied to PUCCH format 1 (for which each group of symbols may consist of more than one symbol).

As shown in FIG. 8, the PUCCH resource sets are each transmitted in accordance with a frequency hopping pattern. For example, PUCCH1 hops from RB 3 in symbol 12 to RB N_BWP-4 in symbol 13, PUCCH2 hops from RB 4 in symbol 12 to RB N_BWP-5 in symbol 13, PUCCH3 hops from RB 5 in symbol 12 to RB N_BWP-6 in symbol 13, PUCCH4 hops from RB N_BWP-6 in symbol 12 to RB 5 in symbol 13, PUCCH5 hops from RB N_BWP-5 in symbol 12 to RB 4 in symbol 13, and PUCCH6 hops from RB N_BWP-4 in symbol 12 to RB 3 in symbol 13. The respective frequency hopping patterns are "mirrored" with respect to a center of the UL BWP. As a result, the frequency hopping patterns are associated with different hop distances (e.g., PUCCH1 and PUCCH6 have a longer frequency hop than PUCCH2 or PUCCH5, which in turn have a longer frequency hop than PUCCH3 or PUCCH4).

Figure 9:
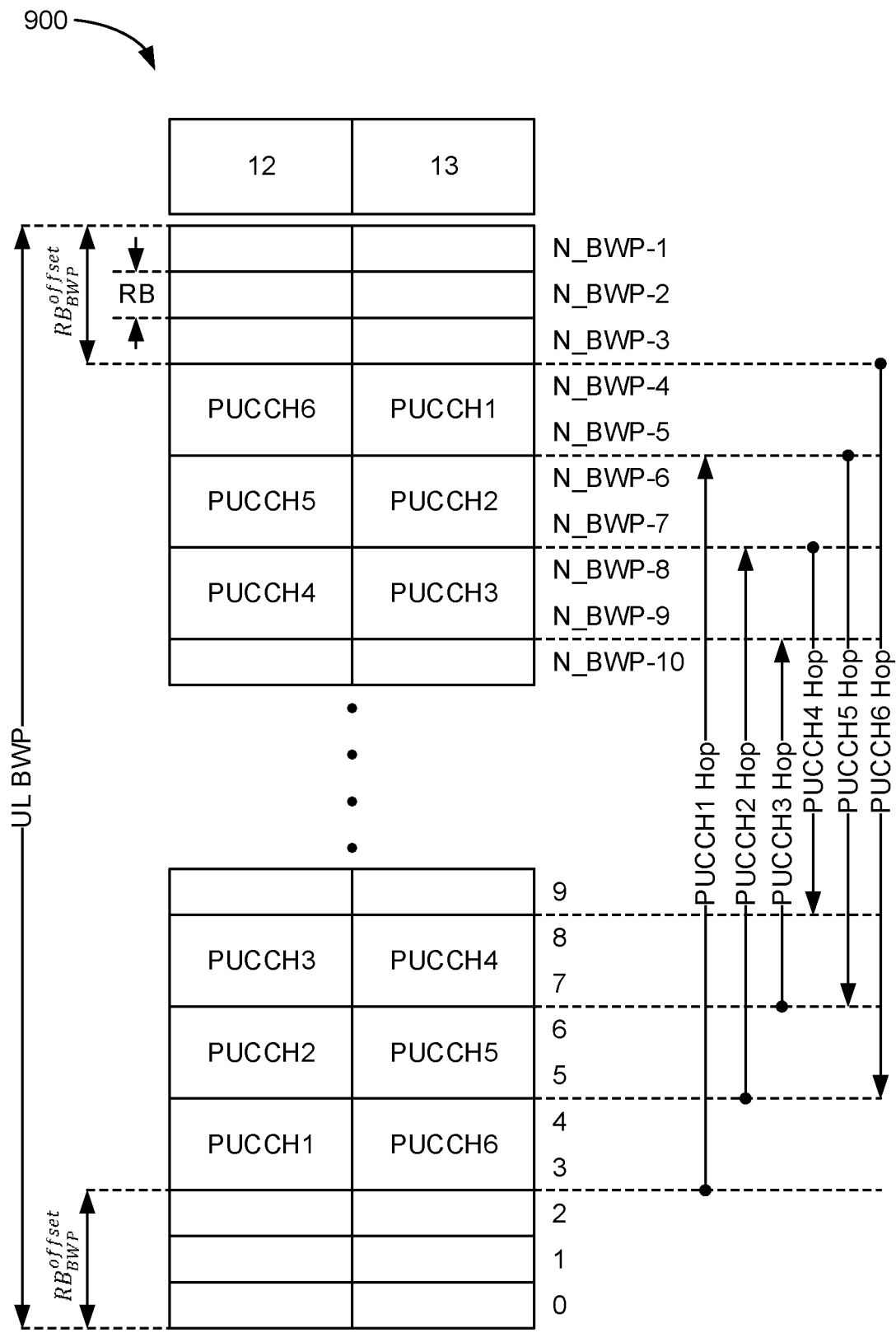
FIG. 9 illustrates a multi-RB resource configuration of UL BWP in accordance with an aspect of the disclosure.

FIG. 9 illustrates a multi-RB resource configuration 900 of UL BWP in accordance with an aspect of the disclosure. With respect to FIG. 9, the PUCCH resource in each of symbols 12-13 span two (2) RBs rather than one as in FIG. 8. For example, in Rel-17, for NR operating in the band of 52.6 to 71 GHz, multi-RB PUCCH formats (PFs) 0/1/4 are supported. It is likewise beneficial to support multi-RB PF 0/1 for common PUCCH resource sets. For example, in SIB1, along with pucch-ResourceCommon, a new parameter N_RB is introduced. Hence, instead of a PUCCH resource in each symbol being limited to a single RB, the PUCCH resource for a particular PUCCH resource set may instead span multiple RBs in the same group of symbols, as shown in FIG. 9.

However, with multi-RB PUCCH PF 0/1, the non-equal hopping distance which is a result of the BWP mirroring of frequency hopping patterns may become problematic for at least some of the PUCCH resource sets. For example, in FIG. 9, it can be seen that the hopping distance for frequency hops for PUCCH3 and PUCCH4 is much smaller than the frequency hops for PUCCH1 and PUCCH6. This may result in inadequate frequency diversity gain for PUCCH3 and PUCCH4.

Aspects of the disclosure are directed to frequency hopping patterns for PUCCH resource sets for increased diversity gain for certain PUCCH resource sets. In some designs, instead of frequency hopping patterns that result in "mirrored" PUCCH-to-RB allocations across an UL BWP as in FIGS. 8-9, a fixed (or equal) hopping distance may be used, as described below with respect to FIGS. 10-12. In other designs, RBs of adjacent PUCCH resource groups in the same group of symbols may overlap in part (e.g., the PUCCH resource groups are crunched together somewhat, which helps to maintain longer frequency hops between symbols for the respective PUCCH resource sets, irrespective of whether a fixed or non-fixed hopping distance is implemented). Such aspects may provide various technical advantages, such as facilitating greater frequency diversity gain, which may increase a success rate of uplink transmission (e.g., higher success rate for ACK to Msg-4 of 4-step RACH procedure, higher success rate for ACK to Msg-B of 2-step RACH procedure, etc.).

Figure 10:
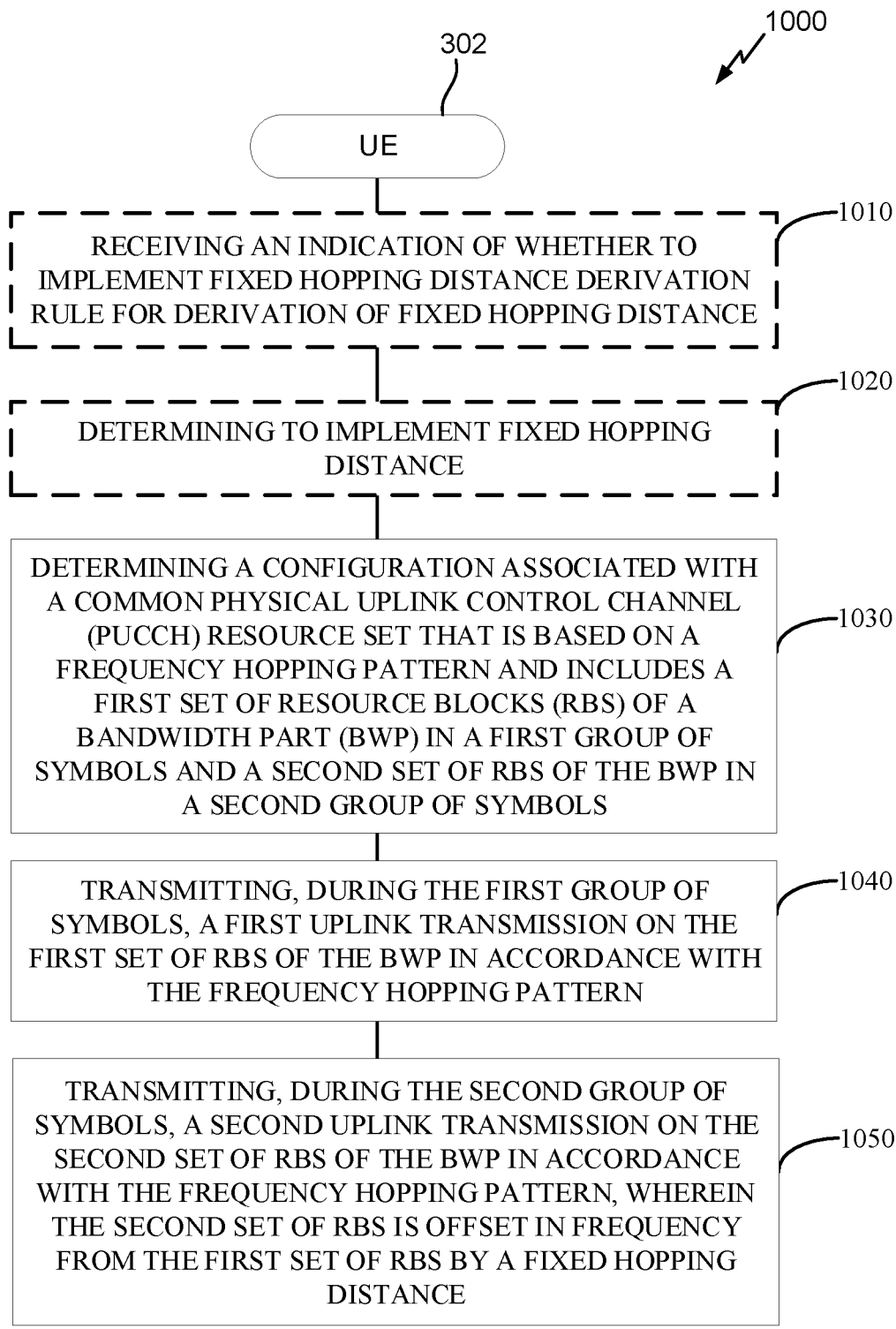
FIG. 10 illustrates an exemplary process of communications according to an aspect of the disclosure.

FIG. 10 illustrates an exemplary process 1000 of communications according to an aspect of the disclosure. The process 1000 of FIG. 10 is performed by a UE, such as UE 302.

Referring to FIG. 10, at 1010, UE 302 (e.g., receiver 312 or 322, etc.) optionally receives an indication of whether to implement a fixed hopping distance derivation rule for derivation of the fixed hopping distance. For example, the indication may be received in SIB (e.g., SIB1) as a new parameter (or flag) denoted as EqualDistanceHopping together with pucch-ResourceCommon. In some designs, if this new parameter EqualDistanceHopping is not present, then a legacy frequency hopping pattern may be implemented rather than a fixed hopping distance (e.g., as in Rel. 15, as depicted in FIGS. 8-9). The indication of 1010 is also optional because the network may instead directly configure the fixed hopping distance rather than providing a flag for the UE itself to derive the fixed hopping distance. Various examples of fixed hopping distance derivation rules will be described below in more detail.

Referring to FIG. 10, at 1020, UE 302 (e.g., receiver 312 or 322, etc.) optionally determines to implement the fixed hopping distance between the first and second sets of RBs (i.e., $N_{RB}$ or N_RB) based in part on a number of RBs among each of the first and second sets of RBs. For example, the fixed hopping distance is implemented if the number of RBs is greater than a threshold (e.g., as shown in FIGS. 8-9, the frequency diversity gain problem may become worse as N_RB increases, such that more benefit may be obtained from the fixed hopping distance). If UE 302 opts to implement the fixed hopping distance at 1020, the fixed hopping distance itself may be determined in various ways. For example, the fixed hopping distance may be configured via RRC signaling (e.g., indicated via SIB1), or the fixed hopping distance may be derived at the UE using a hopping distance derivation rule.

Referring to FIG. 10, at 1030, UE 302 (e.g., processor(s) 332, PUCCH component 332, etc.) determines a configuration associated with a common PUCCH resource set that is based on a frequency hopping pattern and includes a first set of RBs of a BWP in a first group of symbols and a second set of RBs of the BWP in a second group of symbols. In some designs, the configuration at 1030 may be configured via RRC signaling (e.g., together with pucch-ResourceCommon in SIB1). In some designs, the first and second sets of RBs each includes a single RB, similar to FIG. 8. In other designs, the first and second sets of RBs each includes multiple RBs, similar to FIG. 9 (e.g., N_RB).

Referring to FIG. 10, at 1040, UE 302 (e.g., transmitter 314 or 324, etc.) transmits, during the first group of symbols, a first uplink transmission on the first set of RBs of the BWP in accordance with the frequency hopping pattern. In some designs, as will be explained below in more detail, UE 302 may derive a starting RB for the first set of RBs based on factors such as $\gamma_{PUCCH}$, $RB_{BWP}^{offset}$, $N_{cs}$, and NRB (or N_RB).

Referring to FIG. 10, at 1050, UE 302 (e.g., transmitter 314 or 324, etc.) transmits, during the second group of symbols, a second uplink transmission on the second set of RBs of the BWP in accordance with the frequency hopping pattern. In particular, the second set of RBs is offset in frequency from the first set of RBs by a fixed hopping distance. By contrast, in FIGS. 8-9, a fixed hopping distance is not used, and the hopping distance between symbols 12-13 for each PUCCH resource set is variable based on the relative position of the respective RB(s) in the UL BWP (e.g., which produces the aforementioned BWP-mirrored frequency hopping patterns).

Referring to FIG. 10, in some designs, assume that the first and second sets of RBs each includes multiple RBs (denoted by either NRB or N_RB). In some designs, the fixed hopping distance (which is denoted below as "HoppingDistance") is configured via RRC signaling (e.g., together with pucch-ResourceCommon, a new parameter, HoppingDistance, may be included in SIB such as SIB1), and if HoppingDistance is not included, then a legacy frequency hopping pattern such as depicted in FIGS. 8-9 may be used as a fallback). In some designs, the starting RB (or first RB index) for the first and second group of symbols (e.g., symbols 12-13) may be derived as follows:

If $\gamma_{PUCCH}$<8, first RB index in the first group of $$\text{symbols} = RB_{BWP}^{offset} + \left\lfloor \frac{\gamma_{PUCCH}}{N_{CS}} \right\rfloor * N_{RB},$$

and first RB index in the second group of $$\text{symbols} = RB_{BWP}^{offset} + \left\lfloor \frac{\gamma_{PUCCH}}{N_{CS}} \right\rfloor * N_{RB} + \text{Hopping Distance},$$

and

If $\gamma_{PUCCH}$>=8, first RB index in the first group of $$\text{symbols} = N_{BWP}^{size} - RB_{BWP}^{offset} - \left(\left\lfloor \frac{\gamma_{PUCCH} - 8}{N_{CS}} \right\rfloor + 1\right) * N_{RB},$$

and first RB index in the second group of symbols =

$$N_{BWP}^{size} - RB_{BWP}^{offset} - \left(\left\lfloor \frac{\gamma_{PUCCH} - 8}{N_{CS}} \right\rfloor + 1\right) * N_{RB} - \text{Hopping Distance}.$$

In either case, HoppingDistance is used as a fixed offset between the first RB indexes of the first and second group of symbols. In some designs, depending on the value of HoppingDistance, the set of RBs used by the cases $\gamma_{PUCCH}$<8 may be different from $\gamma_{PUCCH}$>=8.

Figure 11:
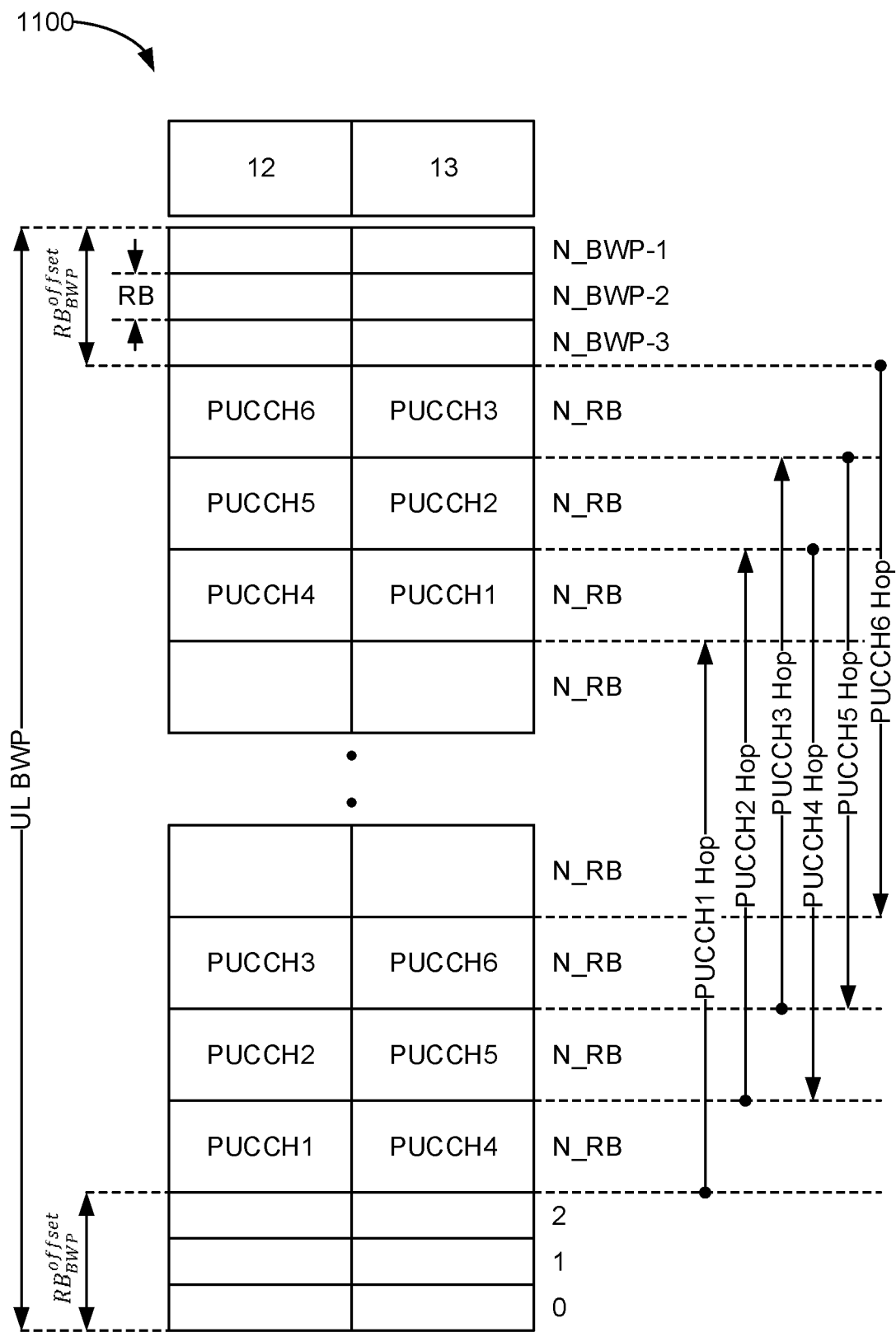
FIG. 11 illustrates a multi-RB resource configuration of UL BWP in accordance with an example implementation of the process of FIG. 10.

FIG. 11 illustrates a multi-RB resource configuration 1100 of UL BWP in accordance with an example implementation of the process 1000 of FIG. 10. With respect to FIG. 11, the PUCCH resource in each of symbols 12-13 span a number of RBs denoted as N_RB. Also, the same RBs for PUCCH resources in symbol 12 are used for PUCCH resources in symbol 13 as well. Unlike the BWP-mirroring frequency hopping patterns of FIGS. 8-9, a fixed hopping distance is used for frequency hops between symbols 12-13 for each of PUCCH1 through PUCCH6. Hence, the short hopping distances associated with PUCCH3 and PUCCH4 in FIGS. 8-9 (which may lack a desired amount of frequency diversity gain) are avoided. In FIG. 11, the BWP is associated with a plurality of common PUCCH resource sets that each include respective sets of RBs that do not overlap with respective sets of RBs of any other common PUCCH resource set in the same group of symbols.

Figure 12:
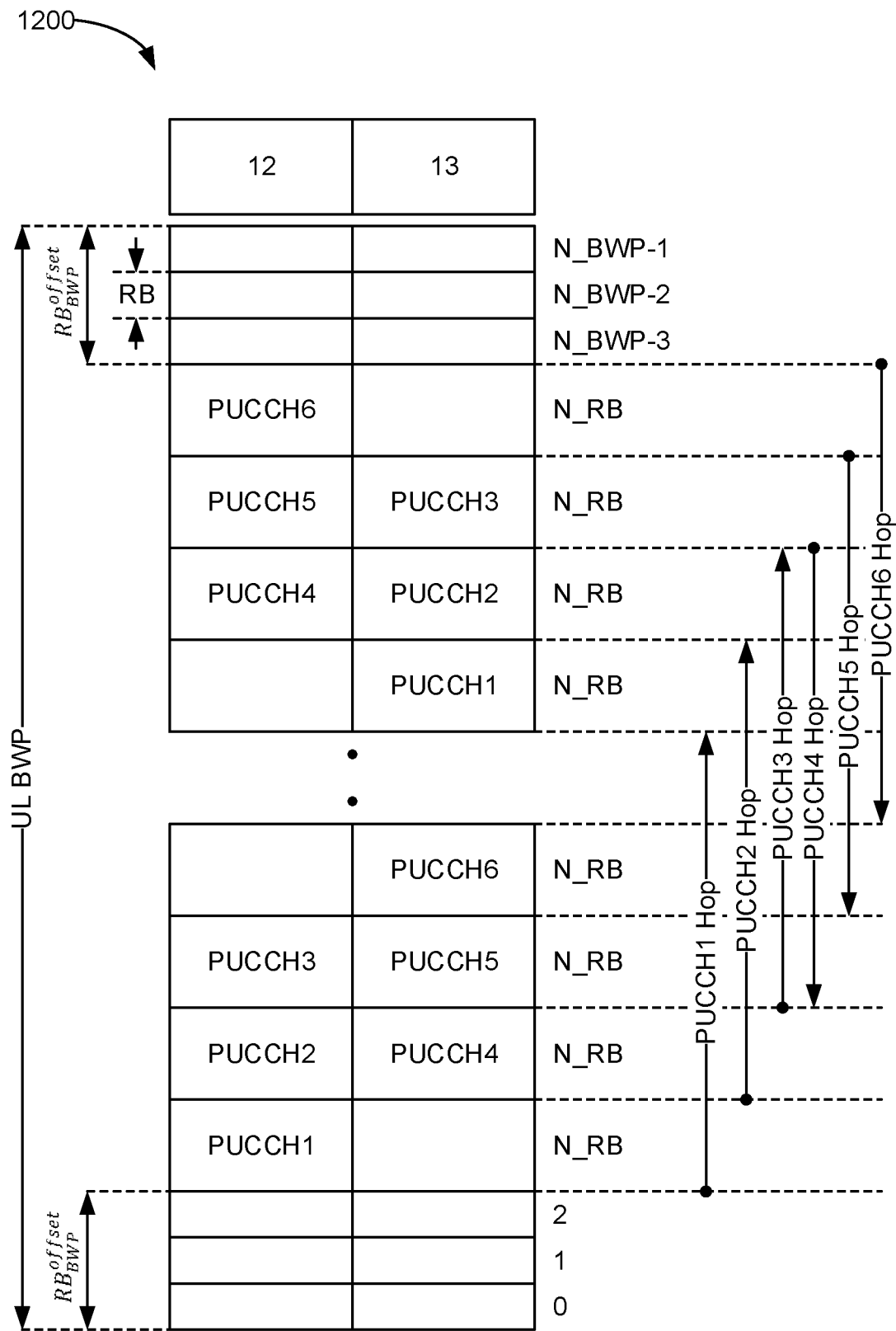
FIG. 12 illustrates a multi-RB resource configuration of UL BWP in accordance with another example implementation of the process of FIG. 10.

FIG. 12 illustrates a multi-RB resource configuration 1200 of UL BWP in accordance with another example implementation of the process 1000 of FIG. 10. With respect to FIG. 12, the PUCCH resource in each of symbols 12-13 span a number of RBs denoted as N_RB. Unlike FIG. 11, different RBs for PUCCH resources in symbol 12 are used for PUCCH resources in symbol 13. In particular, in this example, the PUCCH RBs in symbol 13 are shifted (towards the middle of UL BWP) by N_RB. Despite this RB shift, a fixed hopping distance is still used for frequency hops between symbols 12-13 for each of PUCCH1 through PUCCH6. Hence, the short hopping distances associated with PUCCH3 and PUCCH4 in FIGS. 8-9 (which may lack a desired amount of frequency diversity gain) are avoided. Similar to FIG. 11, in FIG. 12, the BWP is associated with a plurality of common PUCCH resource sets that each include respective sets of RBs that do not overlap with respective sets of RBs of any other common PUCCH resource set in the same group of symbols.

Referring to FIG. 10, in some designs, instead of being directly configured, the fixed hopping distance may instead be derived at the UE using a hopping distance derivation rule (e.g., as mentioned above with respect to optional 1010-1020). In an example, the hopping distance derivation rule may be based on a number of RBs in the BWP, a BWP physical RB (PRB) offset, a number of RBs among each of the first and second sets of RBs, and a number of cyclic shifts (CSs) per RB. In a more specific example, assume that in SIB1, along with pucch-ResourceCommon, a new parameter "EqualDistanceHopping" is introduced. If this parameter is not present, legacy frequency hopping pattern behaviour may be implemented as defined in Rel-15. However, if EqualDistanceHopping is present along with pucch-ResourceCommon, then the second hop first RB index may be calculated as:

$$\text{Find } K = \left\lceil \frac{8}{N_{CS}} \right\rceil,$$

HoppingDistance=$N_{BWP}^{size}$−2*$RB_{BWP}^{offset}$−K*N_RB,

Determine the first RB index in the first group of symbols and second group of symbols, If $\gamma_{PUCCH}$<8, first RB index in the first group of $$\text{symbols} = RB_{BWP}^{offset} + \left\lfloor \frac{\gamma_{PUCCH}}{N_{CS}} \right\rfloor * N_{RB},$$

and first RB index in the second group of $$\text{symbols} = RB_{BWP}^{offset} + \left\lfloor \frac{\gamma_{PUCCH}}{N_{CS}} \right\rfloor * N_{RB} + \text{Hopping Distance},$$

If $\gamma_{PUCCH}$>8, first RB index in the first group of $$\text{symbols} = N_{BWP}^{size} - RB_{BWP}^{offset} - \left(\left\lfloor \frac{\gamma_{PUCCH} - 8}{N_{CS}} \right\rfloor + 1\right) * N_{RB},$$

and first RB index in the second group of symbols =

$$N_{BWP}^{size} - RB_{BWP}^{offset} - \left(\left\lfloor \frac{\gamma_{PUCCH} - 8}{N_{CS}} \right\rfloor + 1\right) * N_{RB} - \text{Hopping Distance}.$$

Referring to FIG. 10, in some designs, the first and second sets of RBs are arranged within the BWP in part based on a number of RBs among each of the first and second sets of RBs. For example, a threshold N may be specified. If N_RB in SIB1 is less than N, then legacy frequency hopping behavior may be implemented, as in FIG. 8 or FIG. 9. Otherwise, an equal (or fixed) hopping distance may be implemented. In this case, the number of RBs can be used in lieu of a fixed hopping distance flag, such as the EqualDistanceHopping parameter as noted above. In some designs, in response to a determination to implement a fixed hopping distance based on N_RB, the fixed hopping distance is implemented if the number of RBs (N_RB) is greater than a threshold (N). Moreover, the manner in which the fixed hopping distance is obtained is flexible. For example, the fixed hopping distance is configured via RRC signaling (e.g., SIB1 parameter, such as HoppingDistance together with pucch-Resource Common), or the fixed hopping distance is derived at the UE using a hopping distance derivation rule, as described above.

Referring to FIG. 10, in some designs, the first and second uplink transmissions are associated with a RACH procedure. In some designs, the RACH procedure is a 4-step RACH procedure and the first and second uplink transmissions are associated with an acknowledgement for Msg-4 of the RACH procedure. In other designs, the RACH procedure is a 2-step RACH procedure and the first and second uplink transmissions are associated with an acknowledgement for Msg-B of the RACH procedure.

Figure 13:
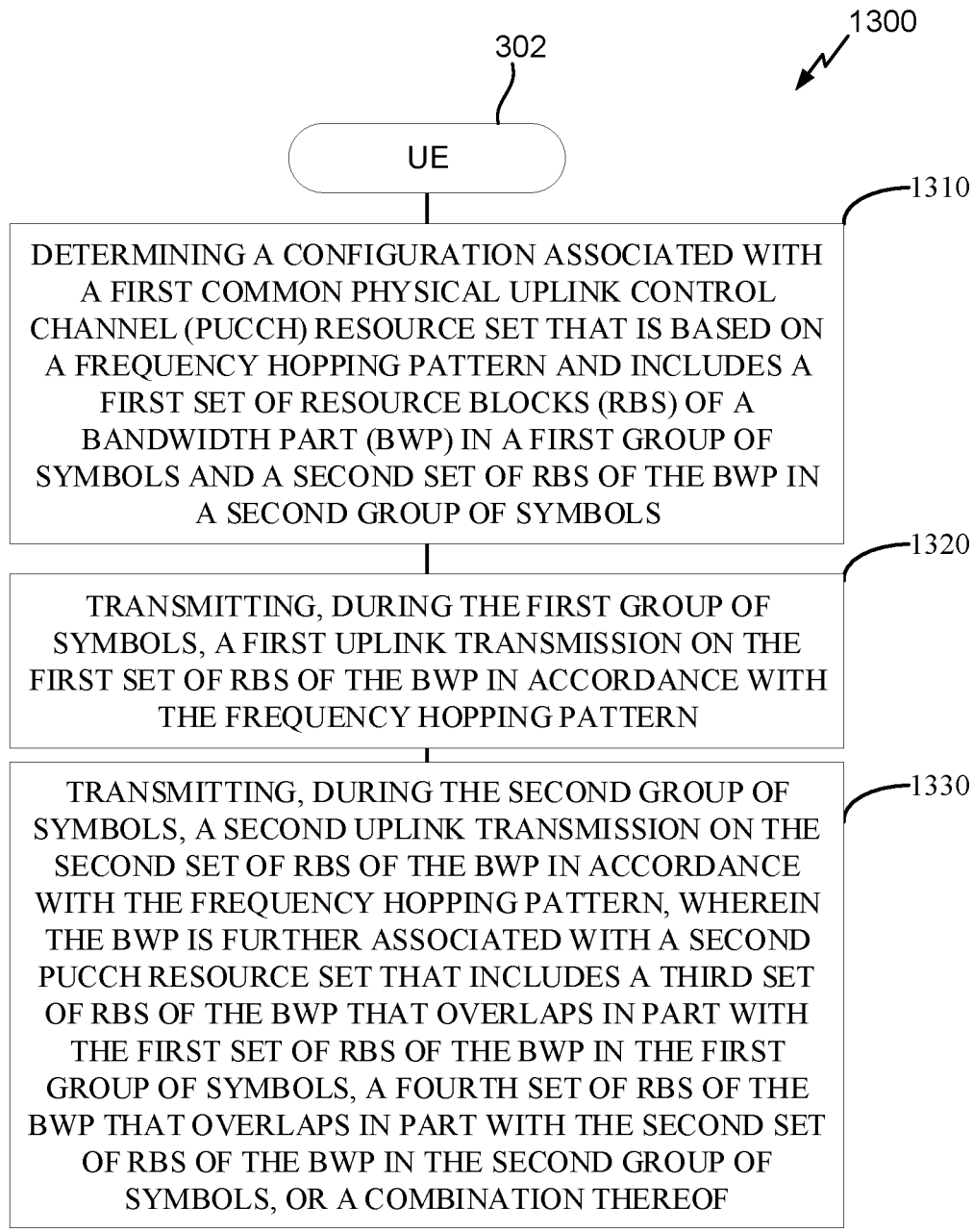
FIG. 13 illustrates an exemplary process of communications according to an aspect of the disclosure.

FIG. 13 illustrates an exemplary process 1300 of communications according to an aspect of the disclosure. The process 1300 of FIG. 13 is performed by a UE, such as UE 302.

Referring to FIG. 13, at 1310, UE 302 (e.g., processor(s) 332, PUCCH component 332, etc.) determines a configuration associated with a first common PUCCH resource set that is based on a frequency hopping pattern and includes a first set of RBs of a BWP in a first group of symbols and a second set of RBs of the BWP in a second group of symbols. In some designs, the configuration at 1310 may be configured via RRC signaling (e.g., with pucch-ResourceCommon in SIB1). In some designs, the first and second sets of RBs each includes multiple RBs, similar to FIG. 9 (e.g., N_RB).

Referring to FIG. 13, at 1320, UE 302 (e.g., transmitter 314 or 324, etc.) transmits, during the first group of symbols, a first uplink transmission on the first set of RBs of the BWP in accordance with the frequency hopping pattern. In some designs, as explained above, UE 302 may derive a starting RB for the first set of RBs based on factors such as $\gamma_{PUCCH}$, $RB_{BWP}^{offset}$, $N_{cs}$, and NRB (or N_RB).

Referring to FIG. 13, at 1330, UE 302 (e.g., transmitter 314 or 324, etc.) transmits, during the second group of symbols, a second uplink transmission on the second set of RBs of the BWP in accordance with the frequency hopping pattern. In particular, the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof. By contrast, the various RB(s) of the various PUCCH resources depicted in FIGS. 8-9 and 11-12 are non-overlapping (e.g., although it will be appreciated that the process 1000 of FIG. 10 is generally implementable with respect to either overlapping or non-overlapping PUCCH resources). In overlapping some of the PUCCH RBs of adjacent PUCCH resource sets in this manner, more inter-symbol frequency diversity gain can be achieved (e.g., because the PUCCH resources between hops can be kept further away from each other) per PUCCH resource set at the cost of additional intra-symbol interference between the RBs of adjacent PUCCH resources. In some designs, the process 1300 of FIG. 13 may be particularly suitable for good channel environments where such intra-symbol interference can be better tolerated.

Referring to FIG. 13, in some designs, the second set of RBs is offset in frequency from the first set of RBs by a fixed hopping distance and the third set of RBs is offset in frequency from the fourth set of RBs by the fixed hopping distance. However, the fixed hopping distance is not strictly necessary in all implementations of the process 1300 of FIG. 13 (e.g., overlapping PUCCH RBs can be implemented in the legacy process of FIG. 9 in some designs, without also implementing the fixed hopping distance). In this case, the second set of RBs is offset in frequency from the first set of RBs by a first hopping distance and the third set of RBs is offset in frequency from the fourth set of RBs by a second hopping distance that is different than the first hopping distance.

FIG. 14 illustrates a multi-RB resource configuration 1400 of UL BWP in accordance with an example implementation of the process 1300 of FIG. 13. With respect to FIG. 14, the PUCCH resource in each of symbols 12-13 span a number of RBs denoted as N_RB. Unlike FIG. 11, different RBs for PUCCH resources in symbol 12 are used for PUCCH resources in symbol 13. In particular, in this example, the PUCCH RBs in symbol 13 are shifted (towards the middle of UL BWP) by N_RB. In contrast to FIG. 11, each adjacent PUCCH resource partial overlaps with one or more adjacent PUCCH resources (e.g., in both symbols 12-13, PUCCH1 and PUCCH4 partially overlap with PUCCH2 and PUCCH5, respectively, and PUCCH2 and PUCCH5 further partially overlap with PUCCH3 and PUCCH6, respectively).

Referring to FIG. 14, in some designs, in FR2x, with narrow beam, it is less likely that many UEs will use common PUCCH resource concurrently, thus, it is possible for gNB to configure (partially) overlapping resource groups. In this case, along with N_RB, SIB1 configure another parameter N_overlap which designates a number of RBs of the partial overlap region between adjacent PUCCH resource groups. In some designs, each PUCCH resource (or resource group) will occupy N_RB, and the N-th resource group will overlap with (n−1)th resource group by N_overlap RBs. Alternatively, the starting RB index of each successive PUCCH resource is shifted by N_shift=N_RB−N_overlap (e.g., such that the third set of RBs is shifted in frequency relative to the first set of RBs, the fourth set of RBs is shifted in frequency relative to the second set of RBs, or a combination thereof). In some designs, scheduling of PUCCH resources with partial overlap may help to address a BWP shortage issue and increases the associated hopping distance. However, there may be performance loss if gNB has to schedule UEs in neighboring overlapping resource groups.

While some aspects of the disclosure are described above with respect to PUCCH format 0, other aspects may be directed to other PUCCH formats, such as PUCCH format 1. In PUCCH format 0, PUCCH may occupy two symbols (e.g., symbols 12 and 13 as shown in various FIGS, although other symbol pairs can be used in PUCCH format 0). In another example, PUCCH format 1 may use 4, 10 or 14 symbols. In this case, the first half number of symbols use same RB(s) while the second half number of symbols use the second hopping RB(s), and each group of symbols consists 2, 5 or 7 symbols.

Figure 15:
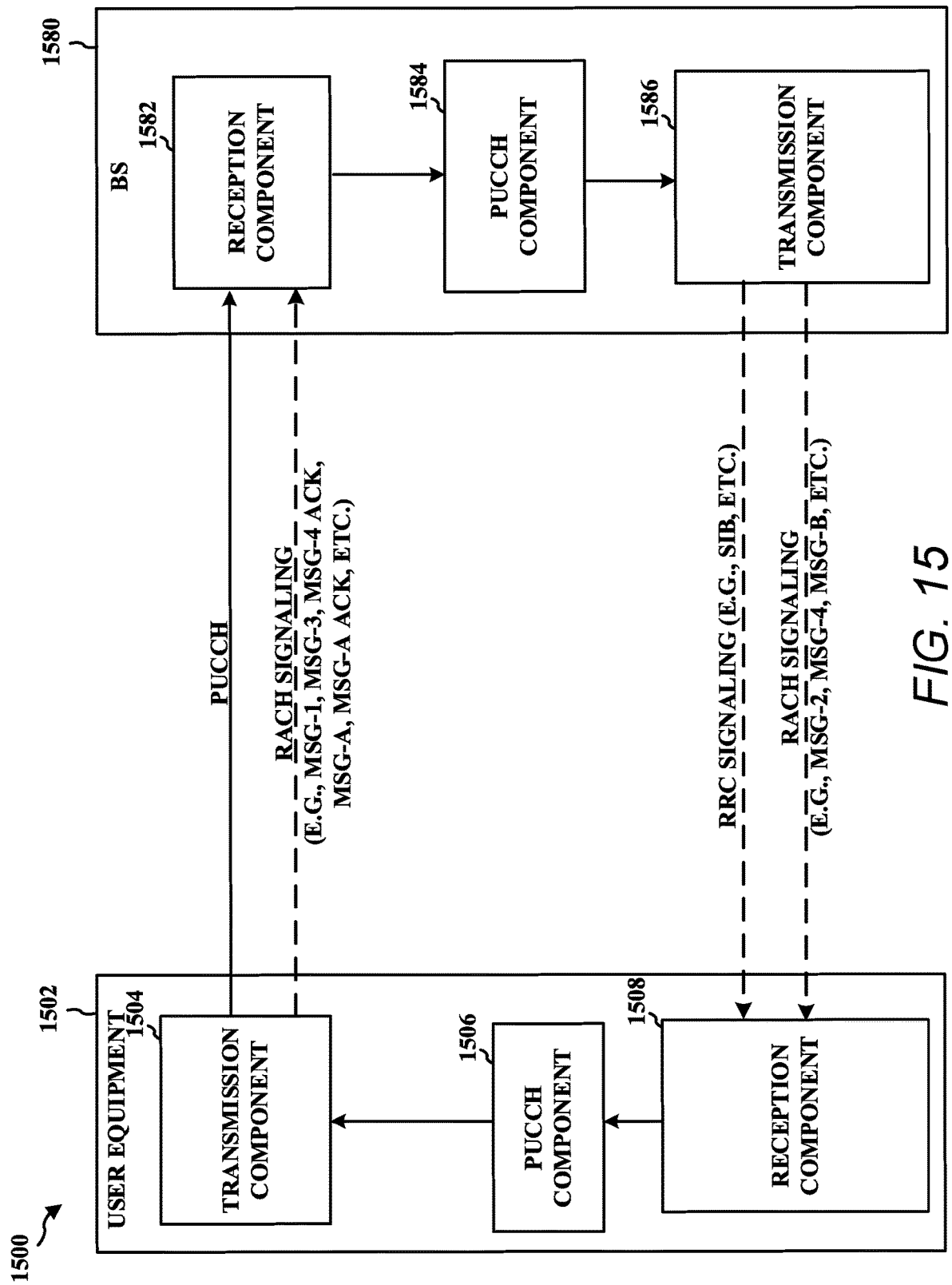
FIG. 15 is a conceptual data flow diagram illustrating the data flow between different means/components in exemplary apparatuses in accordance with an aspect of the disclosure.

FIG. 15 is a conceptual data flow diagram 1500 illustrating the data flow between different means/components in exemplary apparatuses 1502 and 1580 in accordance with an aspect of the disclosure. The apparatus 1502 may be a UE (e.g., UE 302) in communication with an apparatus 1580, which may be a base station (e.g., BS 304).

The apparatus 1502 includes a transmission component 1504, which may correspond to transmitter circuitry in UE 302 as depicted in FIG. 3A, including transmitter(s) 314 and 324, antenna(s) 316 and 326, etc. The apparatus 1502 further includes PUCCH component 1506, which may correspond to processor circuitry in UE 302 as depicted in FIG. 3A, including processing system 332, etc. The apparatus 1502 further includes a reception component 1508, which may correspond to receiver circuitry in UE 302 as depicted in FIG. 3A, including receiver(s) 312 and 322, antenna(s) 316 and 326, etc.

The apparatus 1580 includes a transmission component 1586, which may correspond to transmitter circuitry in BS 304 as depicted in FIG. 3B, including transmitter(s) 354 and 364, antenna(s) 356 and 366, etc. The apparatus 1580 further includes PUCCH component 1584, which may correspond to processor circuitry in BS 304 as depicted in FIG. 3B, including processing system 384, etc. The apparatus 1580 further includes a reception component 1582, which may correspond to receiver circuitry in BS 304 as depicted in FIG. 3B, including receiver(s) 352 and 362, antenna(s) 356 and 366, etc.

Referring to FIG. 15, the apparatus 1502 and the apparatus 1580 may optionally engage in a RACH procedure (e.g., 4-step RACH procedure or 2-step RACH procedure) whereby RACH signaling (e.g., Msg-1, Msg-2, Msg-3, Msg-4, Msg-4 ACK, Msg-A, Msg-B, Msg-B ACK, etc.) is transmitted from the transmission component 1586 to the reception component 1508 and from the transmission component 1504 to the reception component 1582. In some designs, the PUCCH component 1584 may optionally use RRC signaling (e.g., SIB1 associated with Msg-4 or Msg-B) to configure resources for a PUCCH of a common PUCCH resource set. The PUCCH component 1506 may direct the transmission component 1504 to perform transmissions on PUCCH to the reception component 1582 (e.g., in accordance with a fixed frequency hopping distance, via intra-symbol overlapping of adjacent PUCCH RBs, etc.).

One or more components of the apparatus 1502 and apparatus 1580 may perform each of the blocks of the algorithm in the aforementioned flowcharts of FIGS. 10 and 13. As such, each block in the aforementioned flowcharts of FIGS. 10 and 13 may be performed by a component and the apparatus 1502 and apparatus 1580 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
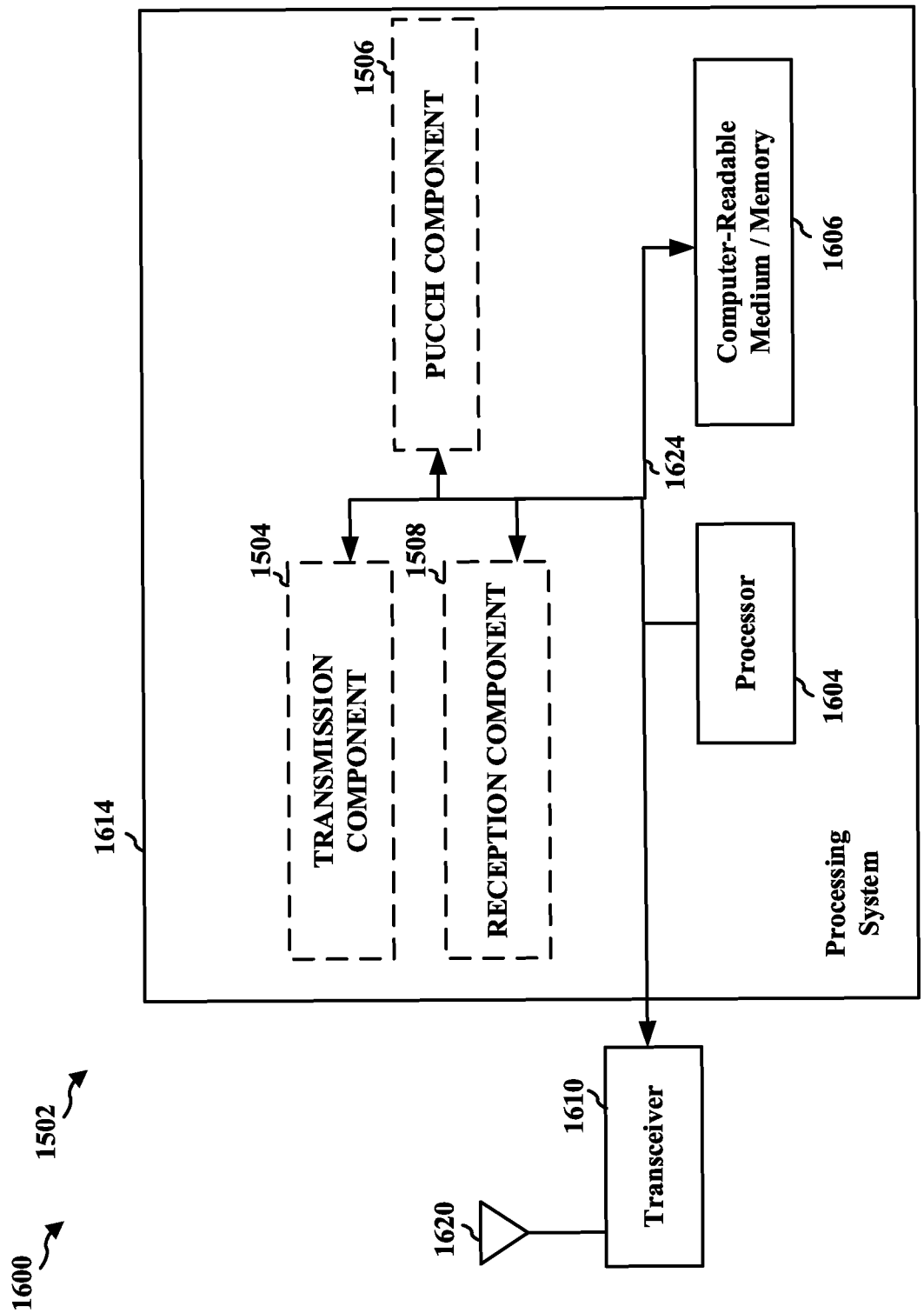
FIGS. 16-17 are diagrams illustrating examples of hardware implementations for apparatuses employing processing systems.

FIG. 16 is a diagram 1600 illustrating an example of a hardware implementation for an apparatus 1502 employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506 and 1508, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1508. In addition, the transceiver 1610 receives information from the processing system 1614, specifically the transmission component 1504, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506 and 1508. The components may be software components running in the processor 1604, resident/stored in the computer readable medium/memory 1606, one or more hardware components coupled to the processor 1604, or some combination thereof.

In one configuration, the apparatus 1502 (e.g., a UE) for wireless communication includes means for determining a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols, means for transmitting, during the first group of symbols, a first uplink transmission on the first set of RBs of the BWP in accordance with the frequency hopping pattern, and means for transmitting, during the second group of symbols, a second uplink transmission on the second set of RBs of the BWP in accordance with the frequency hopping pattern, wherein the second set of RBs is offset in frequency from the first set of RBs by a fixed hopping distance.

The aforementioned means may be one or more of the aforementioned components of the apparatus 1502 and/or the processing system 1614 of the apparatus 1502 configured to perform the functions recited by the aforementioned means.

Figure 17:
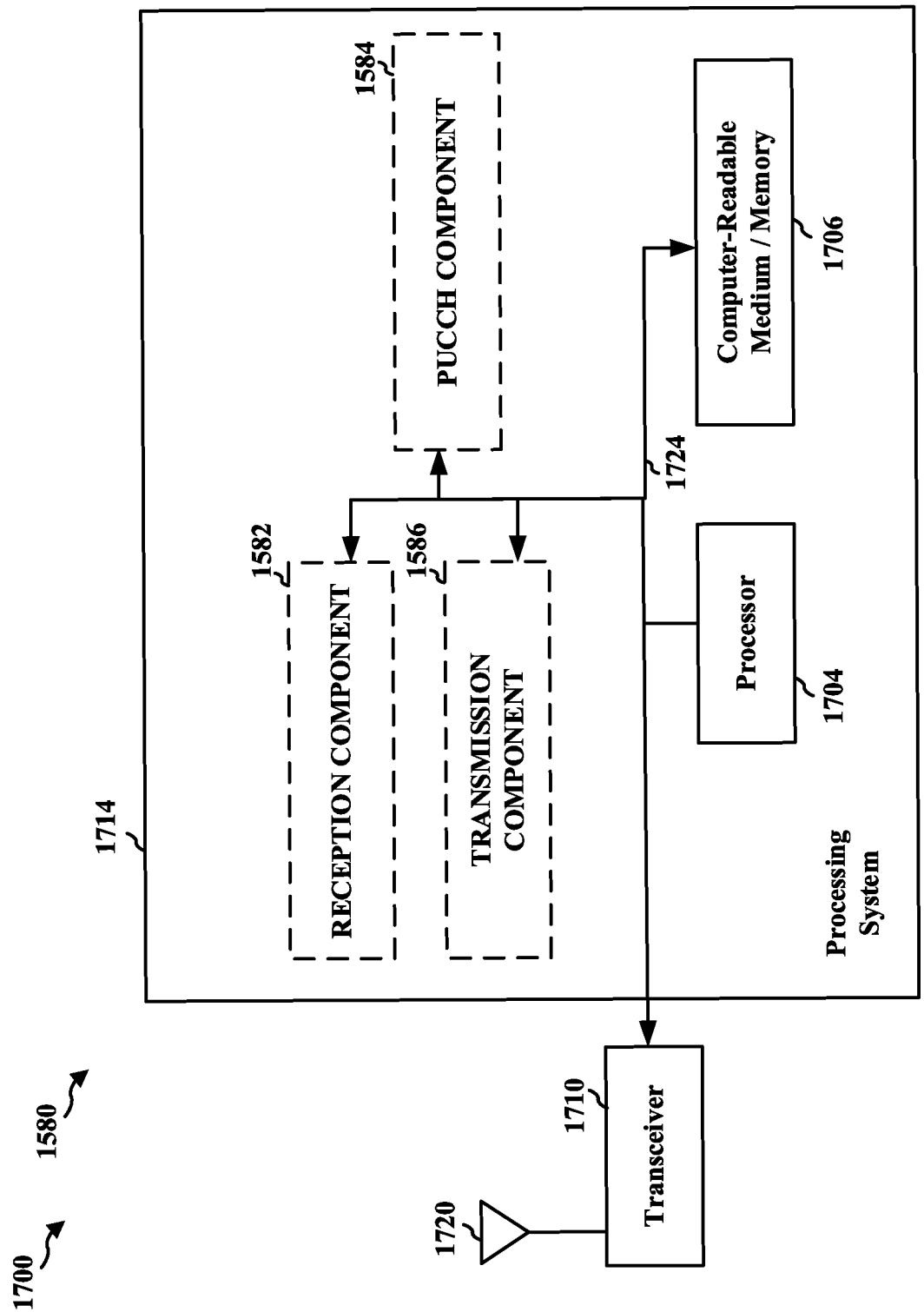

FIG. 17 is a diagram 1700 illustrating an example of a hardware implementation for an apparatus 1580 employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1582, 1584 and 1586, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1582. In addition, the transceiver 1710 receives information from the processing system 1714, specifically the transmission component 1586, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1582, 1584 and 1586. The components may be software components running in the processor 1704, resident/stored in the computer readable medium/memory 1706, one or more hardware components coupled to the processor 1704, or some combination thereof.

In one configuration, the apparatus 1580 (e.g., a BS) for wireless communication may include means for determining a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols, means for transmitting, during the first group of symbols, a first uplink transmission on the first set of RBs of the BWP in accordance with the frequency hopping pattern, and means for transmitting, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

The aforementioned means may be one or more of the aforementioned components of the apparatus 1580 and/or the processing system 1714 of the apparatus 1580 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: determining a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmitting, during the first group of symbols, a first uplink transmission on the first set of RBs of the BWP in accordance with the frequency hopping pattern; and transmitting, during the second group of symbols, a second uplink transmission on the second set of RBs of the BWP in accordance with the frequency hopping pattern, wherein the second set of RBs is offset in frequency from the first set of RBs by a fixed hopping distance.

Clause 2. The method of clause 1, wherein the first and second sets of RBs each includes a single RB.

Clause 3. The method of any of clauses 1 to 2, wherein the first and second sets of RBs each includes multiple RBs.

Clause 4. The method of clause 3, wherein the fixed hopping distance is configured via radio resource control (RRC) signaling.

Clause 5. The method of clause 4, wherein the fixed hopping distance is configured via system information block (SIB).

Clause 6. The method of any of clauses 3 to 5, wherein the fixed hopping distance is derived at the UE using a hopping distance derivation rule.

Clause 7. The method of clause 6, wherein the hopping distance derivation rule is based on a number of RBs in the BWP, a BWP physical RB (PRB) offset, a number of RBs among each of the first and second sets of RBs, and a number of cyclic shifts (CSs) per RB.

Clause 8. The method of any of clauses 6 to 7, further comprising: receiving an indication of whether to implement the fixed hopping distance derivation rule for derivation of the fixed hopping distance.

Clause 9. The method of clause 8, wherein the indication is received at the UE via system information block (SIB).

Clause 10. The method of any of clauses 1 to 9, wherein the first and second sets of RBs are arranged within the BWP in part based on a number of RBs among each of the first and second sets of RBs.

Clause 11. The method of any of clauses 1 to 10, wherein the BWP is associated with a plurality of common PUCCH resource sets that each include respective sets of RBs that do not overlap with respective sets of RBs of any other common PUCCH resource set in the same group of symbols.

Clause 12. The method of any of clauses 1 to 11, further comprising: determining to implement the fixed hopping distance between the first and second sets of RBs based in part on a number of RBs among each of the first and second sets of RBs.

Clause 13. The method of clause 12, wherein the fixed hopping distance is implemented if the number of RBs is greater than a threshold.

Clause 14. The method of any of clauses 12 to 13, wherein the fixed hopping distance is configured via radio resource control (RRC) signaling, or wherein the fixed hopping distance is derived at the UE using a hopping distance derivation rule.

Clause 15. The method of any of clauses 1 to 14, wherein the first and second uplink transmissions are associated with a random access channel (RACH) procedure.

Clause 16. The method of clause 15, wherein the RACH procedure is a 4-step RACH procedure and the first and second uplink transmissions are associated with an acknowledgement for Msg-4 of the RACH procedure.

Clause 17. The method of any of clauses 15 to 16, wherein the RACH procedure is a 2-step RACH procedure and the first and second uplink transmissions are associated with an acknowledgement for Msg-B of the RACH procedure.

Clause 18. A method of operating a user equipment (UE), comprising: determining a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmitting, during the first group of symbols, a first uplink transmission on the first set of RBs of the BWP in accordance with the frequency hopping pattern; and transmitting, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

Clause 19. The method of clause 18, wherein the second set of RBs is offset in frequency from the first set of RBs by a fixed hopping distance and the third set of RBs is offset in frequency from the fourth set of RBs by the fixed hopping distance.

Clause 20. The method of any of clauses 18 to 19, wherein the second set of RBs is offset in frequency from the first set of RBs by a first hopping distance and the third set of RBs is offset in frequency from the fourth set of RBs by a second hopping distance that is different than the first hopping distance.

Clause 21. The method of any of clauses 18 to 20, wherein the third set of RBs is shifted in frequency relative to the first set of RBs, the fourth set of RBs is shifted in frequency relative to the second set of RBs, or a combination thereof.

Clause 22. A user equipment (UE), comprising: a memory; at least one transceiver; and at least one processor communicatively coupled to the memory and the at least one transceiver, the at least one processor configured to: determine a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmit, via the at least one transceiver, during the first group of symbols, a first uplink transmission on the first set of RBs of the BWP in accordance with the frequency hopping pattern; and transmit, via the at least one transceiver, during the second group of symbols, a second uplink transmission on the second set of RBs of the BWP in accordance with the frequency hopping pattern, wherein the second set of RBs is offset in frequency from the first set of RBs by a fixed hopping distance.

Clause 23. The UE of clause 22, wherein the first and second sets of RBs each includes a single RB.

Clause 24. The UE of any of clauses 22 to 23, wherein the first and second sets of RBs each includes multiple RBs.

Clause 25. The UE of clause 24, wherein the fixed hopping distance is configured via radio resource control (RRC) signaling.

Clause 26. The UE of clause 25, wherein the fixed hopping distance is configured via system information block (SIB).

Clause 27. The UE of any of clauses 24 to 26, wherein the fixed hopping distance is derived at the UE using a hopping distance derivation rule.

Clause 28. The UE of clause 27, wherein the hopping distance derivation rule is based on a number of RBs in the BWP, a BWP physical RB (PRB) offset, a number of RBs among each of the first and second sets of RBs, and a number of cyclic shifts (CSs) per RB.

Clause 29. The UE of any of clauses 27 to 28, wherein the at least one processor is further configured to: receive, via the at least one transceiver, an indication of whether to implement the fixed hopping distance derivation rule for derivation of the fixed hopping distance.

Clause 30. The UE of clause 29, wherein the indication is received at the UE via system information block (SIB).

Clause 31. The UE of any of clauses 22 to 30, wherein the first and second sets of RBs are arranged within the BWP in part based on a number of RBs among each of the first and second sets of RBs.

Clause 32. The UE of any of clauses 22 to 31, wherein the BWP is associated with a plurality of common PUCCH resource sets that each include respective sets of RBs that do not overlap with respective sets of RBs of any other common PUCCH resource set in the same group of symbols.

Clause 33. The UE of any of clauses 22 to 32, wherein the at least one processor is further configured to: determine to implement the fixed hopping distance between the first and second sets of RBs based in part on a number of RBs among each of the first and second sets of RBs.

Clause 34. The UE of clause 33, wherein the fixed hopping distance is implemented if the number of RBs is greater than a threshold.

Clause 35. The UE of any of clauses 33 to 34, wherein the fixed hopping distance is configured via radio resource control (RRC) signaling, or wherein the fixed hopping distance is derived at the UE using a hopping distance derivation rule.

Clause 36. The UE of any of clauses 22 to 35, wherein the first and second uplink transmissions are associated with a random access channel (RACH) procedure.

Clause 37. The UE of clause 36, wherein the RACH procedure is a 4-step RACH procedure and the first and second uplink transmissions are associated with an acknowledgement for Msg-4 of the RACH procedure.

Clause 38. The UE of any of clauses 36 to 37, wherein the RACH procedure is a 2-step RACH procedure and the first and second uplink transmissions are associated with an acknowledgement for Msg-B of the RACH procedure.

Clause 39. A UE, comprising: a memory; at least one transceiver; and at least one processor communicatively coupled to the memory and the at least one transceiver, the at least one processor configured to: determine a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmit, via the at least one transceiver, during the first group of symbols, a first uplink transmission on the first set of RBs of the BWP in accordance with the frequency hopping pattern; and transmit, via the at least one transceiver, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

Clause 40. The UE of clause 39, wherein the second set of RBs is offset in frequency from the first set of RBs by a fixed hopping distance and the third set of RBs is offset in frequency from the fourth set of RBs by the fixed hopping distance.

Clause 41. The UE of any of clauses 39 to 40, wherein the second set of RBs is offset in frequency from the first set of RBs by a first hopping distance and the third set of RBs is offset in frequency from the fourth set of RBs by a second hopping distance that is different than the first hopping distance.

Clause 42. The UE of any of clauses 39 to 41, wherein the third set of RBs is shifted in frequency relative to the first set of RBs, the fourth set of RBs is shifted in frequency relative to the second set of RBs, or a combination thereof.

Clause 43. A user equipment (UE), comprising: means for determining a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; means for transmitting, during the first group of symbols, a first uplink transmission on the first set of RBs of the BWP in accordance with the frequency hopping pattern; and means for transmitting, during the second group of symbols, a second uplink transmission on the second set of RBs of the BWP in accordance with the frequency hopping pattern, wherein the second set of RBs is offset in frequency from the first set of RBs by a fixed hopping distance.

Clause 44. The UE of clause 43, wherein the first and second sets of RBs each includes a single RB.

Clause 45. The UE of any of clauses 43 to 44, wherein the first and second sets of RBs each includes multiple RBs.

Clause 46. The UE of clause 45, wherein the fixed hopping distance is configured via radio resource control (RRC) signaling.

Clause 47. The UE of clause 46, wherein the fixed hopping distance is configured via system information block (SIB).

Clause 48. The UE of any of clauses 45 to 47, wherein the fixed hopping distance is derived at the UE using a hopping distance derivation rule.

Clause 49. The UE of clause 48, wherein the hopping distance derivation rule is based on a number of RBs in the BWP, a BWP physical RB (PRB) offset, a number of RBs among each of the first and second sets of RBs, and a number of cyclic shifts (CSs) per RB.

Clause 50. The UE of any of clauses 48 to 49, further comprising: means for receiving an indication of whether to implement the fixed hopping distance derivation rule for derivation of the fixed hopping distance.

Clause 51. The UE of clause 50, wherein the indication is received at the UE via system information block (SIB).

Clause 52. The UE of any of clauses 43 to 51, wherein the first and second sets of RBs are arranged within the BWP in part based on a number of RBs among each of the first and second sets of RBs.

Clause 53. The UE of any of clauses 43 to 52, wherein the BWP is associated with a plurality of common PUCCH resource sets that each include respective sets of RBs that do not overlap with respective sets of RBs of any other common PUCCH resource set in the same group of symbols.

Clause 54. The UE of any of clauses 43 to 53, further comprising: means for determining to implement the fixed hopping distance between the first and second sets of RBs based in part on a number of RBs among each of the first and second sets of RBs.

Clause 55. The UE of clause 54, wherein the fixed hopping distance is implemented if the number of RBs is greater than a threshold.

Clause 56. The UE of any of clauses 54 to 55, wherein the fixed hopping distance is configured via radio resource control (RRC) signaling, or wherein the fixed hopping distance is derived at the UE using a hopping distance derivation rule.

Clause 57. The UE of any of clauses 43 to 56, wherein the first and second uplink transmissions are associated with a random access channel (RACH) procedure.

Clause 58. The UE of clause 57, wherein the RACH procedure is a 4-step RACH procedure and the first and second uplink transmissions are associated with an acknowledgement for Msg-4 of the RACH procedure.

Clause 59. The UE of any of clauses 57 to 58, wherein the RACH procedure is a 2-step RACH procedure and the first and second uplink transmissions are associated with an acknowledgement for Msg-B of the RACH procedure.

Clause 60. A UE, comprising: means for determining a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; means for transmitting, during the first group of symbols, a first uplink transmission on the first set of RBs of the BWP in accordance with the frequency hopping pattern; and means for transmitting, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

Clause 61. The UE of clause 60, wherein the second set of RBs is offset in frequency from the first set of RBs by a fixed hopping distance and the third set of RBs is offset in frequency from the fourth set of RBs by the fixed hopping distance.

Clause 62. The UE of any of clauses 60 to 61, wherein the second set of RBs is offset in frequency from the first set of RBs by a first hopping distance and the third set of RBs is offset in frequency from the fourth set of RBs by a second hopping distance that is different than the first hopping distance.

Clause 63. The UE of any of clauses 60 to 62, wherein the third set of RBs is shifted in frequency relative to the first set of RBs, the fourth set of RBs is shifted in frequency relative to the second set of RBs, or a combination thereof.

Clause 64. A non-transitory computer-readable medium storing computer-executable instructions that, when executed by a user equipment (UE), cause the UE to: determine a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmit, during the first group of symbols, a first uplink transmission on the first set of RBs of the BWP in accordance with the frequency hopping pattern; and transmit, during the second group of symbols, a second uplink transmission on the second set of RBs of the BWP in accordance with the frequency hopping pattern, wherein the second set of RBs is offset in frequency from the first set of RBs by a fixed hopping distance.

Clause 65. The non-transitory computer-readable medium of clause 64, wherein the first and second sets of RBs each includes a single RB.

Clause 66. The non-transitory computer-readable medium of any of clauses 64 to 65, wherein the first and second sets of RBs each includes multiple RBs.

Clause 67. The non-transitory computer-readable medium of clause 66, wherein the fixed hopping distance is configured via radio resource control (RRC) signaling.

Clause 68. The non-transitory computer-readable medium of clause 67, wherein the fixed hopping distance is configured via system information block (SIB).

Clause 69. The non-transitory computer-readable medium of any of clauses 66 to 68, wherein the fixed hopping distance is derived at the UE using a hopping distance derivation rule.

Clause 70. The non-transitory computer-readable medium of clause 69, wherein the hopping distance derivation rule is based on a number of RBs in the BWP, a BWP physical RB (PRB) offset, a number of RBs among each of the first and second sets of RBs, and a number of cyclic shifts (CSs) per RB.

Clause 71. The non-transitory computer-readable medium of any of clauses 69 to 70, wherein the one or more instructions further cause the UE to: receive an indication of whether to implement the fixed hopping distance derivation rule for derivation of the fixed hopping distance.

Clause 72. The non-transitory computer-readable medium of clause 71, wherein the indication is received at the UE via system information block (SIB).

Clause 73. The non-transitory computer-readable medium of any of clauses 64 to 72, wherein the first and second sets of RBs are arranged within the BWP in part based on a number of RBs among each of the first and second sets of RBs.

Clause 74. The non-transitory computer-readable medium of any of clauses 64 to 73, wherein the BWP is associated with a plurality of common PUCCH resource sets that each include respective sets of RBs that do not overlap with respective sets of RBs of any other common PUCCH resource set in the same group of symbols.

Clause 75. The non-transitory computer-readable medium of any of clauses 64 to 74, wherein the one or more instructions further cause the UE to: determine to implement the fixed hopping distance between the first and second sets of RBs based in part on a number of RBs among each of the first and second sets of RBs.

Clause 76. The non-transitory computer-readable medium of clause 75, wherein the fixed hopping distance is implemented if the number of RBs is greater than a threshold.

Clause 77. The non-transitory computer-readable medium of any of clauses 75 to 76, wherein the fixed hopping distance is configured via radio resource control (RRC) signaling, or wherein the fixed hopping distance is derived at the UE using a hopping distance derivation rule.

Clause 78. The non-transitory computer-readable medium of any of clauses 64 to 77, wherein the first and second uplink transmissions are associated with a random access channel (RACH) procedure.

Clause 79. The non-transitory computer-readable medium of clause 78, wherein the RACH procedure is a 4-step RACH procedure and the first and second uplink transmissions are associated with an acknowledgement for Msg-4 of the RACH procedure.

Clause 80. The non-transitory computer-readable medium of any of clauses 78 to 79, wherein the RACH procedure is a 2-step RACH procedure and the first and second uplink transmissions are associated with an acknowledgement for Msg-B of the RACH procedure.

Clause 81. A non-transitory computer-readable medium storing computer-executable instructions that, when executed by a UE, cause the UE to: determine a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols; transmit, during the first group of symbols, a first uplink transmission on the first set of RBs of the BWP in accordance with the frequency hopping pattern; and transmit, during the second group of symbols, a second uplink transmission on the second set of RBs of the BWP in accordance with the frequency hopping pattern, wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

Clause 82. The non-transitory computer-readable medium of clause 81, wherein the second set of RBs is offset in frequency from the first set of RBs by a fixed hopping distance and the third set of RBs is offset in frequency from the fourth set of RBs by the fixed hopping distance.

Clause 83. The non-transitory computer-readable medium of any of clauses 81 to 82, wherein the second set of RBs is offset in frequency from the first set of RBs by a first hopping distance and the third set of RBs is offset in frequency from the fourth set of RBs by a second hopping distance that is different than the first hopping distance.

Clause 84. The non-transitory computer-readable medium of any of clauses 81 to 83, wherein the third set of RBs is shifted in frequency relative to the first set of RBs, the fourth set of RBs is shifted in frequency relative to the second set of RBs, or a combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a memory;
at least one transceiver; and
at least one processor communicatively coupled to the memory and the at least one transceiver, the at least one processor configured to:
determine a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols;
transmit, via the at least one transceiver, during the first group of symbols, a first uplink transmission on the first set of RBs of the BWP in accordance with the frequency hopping pattern; and
transmit, via the at least one transceiver, during the second group of symbols, a second uplink transmission on the second set of RBs of the BWP in accordance with the frequency hopping pattern,
wherein the second set of RBs is offset in frequency from the first set of RBs by a fixed hopping distance; and
determine to implement the fixed hopping distance between the first and second sets of RBs based in part on a number of RBs among each of the first and second sets of RBs.

2. The UE of claim 1, wherein the first and second sets of RBs each includes a single RB.

3. The UE of claim 1, wherein the first and second sets of RBs each includes multiple RBs.

4. The UE of claim 3, wherein the fixed hopping distance is configured via radio resource control (RRC) signaling.

5. The UE of claim 4, wherein the fixed hopping distance is configured via system information block (SIB).

6. The UE of claim 3, wherein the fixed hopping distance is derived at the UE using a hopping distance derivation rule.

7. The UE of claim 6, wherein the hopping distance derivation rule is based on a number of RBs in the BWP, a BWP physical RB (PRB) offset, a number of RBs among each of the first and second sets of RBs, and a number of cyclic shifts (CSs) per RB.

8. The UE of claim 6, wherein the at least one processor is further configured to:
receive, via the at least one transceiver, an indication of whether to implement the hopping distance derivation rule for derivation of the fixed hopping distance.

9. The UE of claim 8, wherein the indication is received at the UE via system information block (SIB).

10. The UE of claim 1, wherein the first and second sets of RBs are arranged within the BWP in part based on a number of RBs among each of the first and second sets of RBs.

11. The UE of claim 1, wherein the BWP is associated with a plurality of common PUCCH resource sets that each include respective sets of RBs that do not overlap with respective sets of RBs of any other common PUCCH resource set in the same group of symbols.

12. The UE of claim 1, wherein the fixed hopping distance is implemented if the number of RBs is greater than a threshold.

13. The UE of claim 1,
wherein the fixed hopping distance is configured via radio resource control (RRC) signaling, or
wherein the fixed hopping distance is derived at the UE using a hopping distance derivation rule.

14. The UE of claim 1, wherein the first and second uplink transmissions are associated with a random access channel (RACH) procedure.

15. The UE of claim 14, wherein the RACH procedure is a 4-step RACH procedure and the first and second uplink transmissions are associated with an acknowledgement for Msg-4 of the RACH procedure.

16. The UE of claim 14, wherein the RACH procedure is a 2-step RACH procedure and the first and second uplink transmissions are associated with an acknowledgement for Msg-B of the RACH procedure.

17. A user equipment (UE), comprising:
a memory;
at least one transceiver; and
at least one processor communicatively coupled to the memory and the at least one transceiver, the at least one processor configured to:
determine a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols;
transmit, via the at least one transceiver, during the first group of symbols, a first uplink transmission on the first set of RBs of the BWP in accordance with the frequency hopping pattern; and
transmit, via the at least one transceiver, during the second group of symbols, a second uplink transmission on the second set of RBs of the BWP in accordance with the frequency hopping pattern,
wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

18. The UE of claim 17, wherein the second set of RBs is offset in frequency from the first set of RBs by a fixed hopping distance and the third set of RBs is offset in frequency from the fourth set of RBs by the fixed hopping distance.

19. The UE of claim 17, wherein the second set of RBs is offset in frequency from the first set of RBs by a first hopping distance and the third set of RBs is offset in frequency from the fourth set of RBs by a second hopping distance that is different than the first hopping distance.

20. The UE of claim 17, wherein the third set of RBs is shifted in frequency relative to the first set of RBs, the fourth set of RBs is shifted in frequency relative to the second set of RBs, or a combination thereof.

21. A method of operating a user equipment (UE), comprising:
determining a configuration associated with a common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols;
transmitting, during the first group of symbols, a first uplink transmission on the first set of RBs of the BWP in accordance with the frequency hopping pattern; and
transmitting, during the second group of symbols, a second uplink transmission on the second set of RBs of the BWP in accordance with the frequency hopping pattern,
wherein the second set of RBs is offset in frequency from the first set of RBs by a fixed hopping distance; and
determining to implement the fixed hopping distance between the first and second sets of RBs based in part on a number of RBs among each of the first and second sets of RBs.

22. The method of claim 21, wherein the first and second sets of RBs each includes multiple RBs.

23. The method of claim 21, wherein the first and second sets of RBs are arranged within the BWP in part based on a number of RBs among each of the first and second sets of RBs.

24. The method of claim 21, wherein the BWP is associated with a plurality of common PUCCH resource sets that each include respective sets of RBs that do not overlap with respective sets of RBs of any other common PUCCH resource set in the same group of symbols.

25. The method of claim 21, wherein the first and second uplink transmissions are associated with a random access channel (RACH) procedure.

26. A method of operating a user equipment (UE), comprising:
determining a configuration associated with a first common physical uplink control channel (PUCCH) resource set that is based on a frequency hopping pattern and includes a first set of resource blocks (RBs) of a bandwidth part (BWP) in a first group of symbols and a second set of RBs of the BWP in a second group of symbols;
transmitting, during the first group of symbols, a first uplink transmission on the first set of RBs of the BWP in accordance with the frequency hopping pattern; and
transmitting, during the second group of symbols, a second uplink transmission on the second set of RBs of the BWP in accordance with the frequency hopping pattern,
wherein the BWP is further associated with a second PUCCH resource set that includes a third set of RBs of the BWP that overlaps in part with the first set of RBs of the BWP in the first group of symbols, a fourth set of RBs of the BWP that overlaps in part with the second set of RBs of the BWP in the second group of symbols, or a combination thereof.

27. The method of claim 26, wherein the second set of RBs is offset in frequency from the first set of RBs by a fixed hopping distance and the third set of RBs is offset in frequency from the fourth set of RBs by the fixed hopping distance.

28. The method of claim 26, wherein the second set of RBs is offset in frequency from the first set of RBs by a first hopping distance and the third set of RBs is offset in frequency from the fourth set of RBs by a second hopping distance that is different than the first hopping distance.

29. The method of claim 26, wherein the third set of RBs is shifted in frequency relative to the first set of RBs, the fourth set of RBs is shifted in frequency relative to the second set of RBs, or a combination thereof.

* * * * *